United States Patent
Sugimoto et al.

(10) Patent No.: US 6,839,723 B2
(45) Date of Patent: Jan. 4, 2005

(54) INFORMATION MANAGEMENT SYSTEM

(75) Inventors: Yuichiro Sugimoto, Kawasaki (JP); Akira Hayakawa, kohoku-gun (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 09/788,613

(22) Filed: Feb. 21, 2001

(65) Prior Publication Data

US 2002/0053012 A1 May 2, 2002

(30) Foreign Application Priority Data

Aug. 29, 2000 (JP) .......................................... 2000-259835

(51) Int. Cl.⁷ .............................................. G06F 12/00
(52) U.S. Cl. ............................. 707/203; 707/1; 707/2; 707/6; 707/7; 707/10; 707/202; 715/511; 709/100; 709/101
(58) Field of Search ........................ 707/10, 100, 101, 707/102, 104.1, 103 R; 709/100–118, 200–203, 217–226, 318

(56) References Cited

U.S. PATENT DOCUMENTS

| | | | | |
|---|---|---|---|---|
| 5,757,669 A | * | 5/1998 | Christie et al. | 709/205 |
| 5,794,005 A | * | 8/1998 | Steinman | 709/315 |
| 5,828,375 A | * | 10/1998 | Nomura et al. | 707/205 |
| 5,862,325 A | * | 1/1999 | Reed et al. | 707/203 |
| 5,924,096 A | * | 7/1999 | Draper et al. | 707/101 |
| 6,266,716 B1 | * | 7/2001 | Wilson et al. | 709/213 |
| 6,272,537 B1 | * | 8/2001 | Kekic et al. | 709/219 |
| 6,292,803 B1 | * | 9/2001 | Richardson et al. | 707/102 |
| 6,347,374 B1 | * | 2/2002 | Drake et al. | 709/224 |
| 6,446,136 B1 | * | 9/2002 | Pohlmann et al. | 707/104.1 |
| 6,598,049 B1 | * | 7/2003 | Moriyama | 707/100 |
| 6,704,804 B1 | * | 3/2004 | Wilson et al. | 719/315 |

FOREIGN PATENT DOCUMENTS

| | | |
|---|---|---|
| JP | 0818729 A2 | 1/1998 |
| JP | 10-31660 | 2/1998 |

* cited by examiner

*Primary Examiner*—Jean M. Corrielus
*Assistant Examiner*—Anh Ly
(74) *Attorney, Agent, or Firm*—Staas & Halsey LLP

(57) ABSTRACT

An information management system of the present invention includes an information management apparatus and an information request apparatus. The information management apparatus acquires, each time a state of an object varies, state information on these state variations and stores a storage module with the state information. Thereafter, when the information request apparatus makes a request for providing the state information, the information request apparatus is provided with, as difference information, the state information ranging from a piece of state information indicating that the state varies next to the state information provided last to the information request apparatus before receiving the providing request up to a latest piece of state information among plural pieces of state information stored in the storage module.

31 Claims, 21 Drawing Sheets

| REGISTRATION ORDER | INDEX | EVENT REGISTRATION TIME | EVENT TYPE | STATE |
|---|---|---|---|---|
| 0 | 0 | 1998/10/20 12:30:00.00 | ADDITION (GENERATION) OF OBJECT 1 | AS UNLINKED STATE |
| 1 | 1 | 1998/10/20 12:31:00.00 | ADDITION (GENERATION) OF OBJECT 2 | AS UNLINKED STATE |
| 2 | 2 | 1998/10/20 12:32:00.00 | UPDATE OF OBJECT 1 | TO LINKED STATE |
| 3 | 3 | 1998/10/20 12:33:00.00 | UPDATE OF OBJECT 1 | TO DIALOG STATE |
| 4 | 4 | 1998/10/20 12:34:00.00 | UPDATE OF OBJECT 2 | TO LINKED STATE |
| 5 | 5 | 1998/10/20 12:35:00.00 | UPDATE OF OBJECT 2 | TO DIALOG STATE |
| 6 | 6 | 1998/10/20 12:36:00.00 | ADDITION (GENERATION) OF OBJECT 3 | AS UNLINKED STATE |
| 7 | 7 | 1998/10/20 12:37:00.00 | UPDATE OF OBJECT 3 | TO LINKED STATE |
| 8 | 8 | 1998/10/20 12:38:00.00 | UPDATE OF OBJECT 3 | TO DIALOG STATE |
| 9 | 9 | 1998/10/20 12:39:00.00 | UPDATE OF OBJECT 3 | TO UNLINKED STATE |
| 10 | 0 | 1998/10/20 12:40:00.00 | DELETION (DISAPPEARING) OF OBJECT 3 | |
| 11 | 1 | 1998/10/20 12:41:00.00 | UPDATE OF OBJECT 1 | TO UNLINKED STATE |
| 12 | 2 | 1998/10/20 12:42:00.00 | UPDATE OF OBJECT 2 | TO UNLINKED STATE |
| 13 | 3 | 1998/10/20 12:43:00.00 | DELETION (DISAPPEARING) OF OBJECT 1 | |
| 14 | 4 | 1998/10/20 12:44:00.00 | DELETION (DISAPPEARING) OF OBJECT 2 | |

FIG. 5

⟨VARIATION EVENT MESSAGE⟩

| OBJECT NAME | EVENT TYPE | STATE | EVENT OCCURRED TIME |
|---|---|---|---|

*FIG. 7*

<LATEST STATE TABLE>   47(56)

| OBJECT NAME | STATE | LAST EVENT OCCURRED TIME |
|---|---|---|
| OBJECT 1 | XXX | XXXXXX |
| OBJECT 2 | XXX | XXXXXX |
| OBJECT 3 | XXX | XXXXXX |
| ⋮ | ⋮ | ⋮ |

FIG. 9

⟨VARIATION EVENT RECORD TABLE⟩ 51

| OBJECT NAME | EVENT TYPE | STATE | EVENT OCCURRED TIME | EVENT UNNECESSARY FLAG |
|---|---|---|---|---|
| OBJECT 5 | ADD | XXXX | ..... | NECESSARY |
| OBJECT 4 | DELETE | XXXX | ..... | UNNECESSARY |
| OBJECT 2 | UPDATE | XXXX | ..... | UNNECESSARY |
| OBJECT 2 | UPDATE | XXXX | ..... | NECESSARY |
| | | | | |
| | | | | UNNECESSARY |

↑ LAST INDEX POSITION+1 OR POSITION "0"

↑ LATEST

※RECORDS IN RECORD TABLE FORMING VARIATION EVENT CHAIN ARE STROED IN SEQUENCE OF INDEX NUMBERS

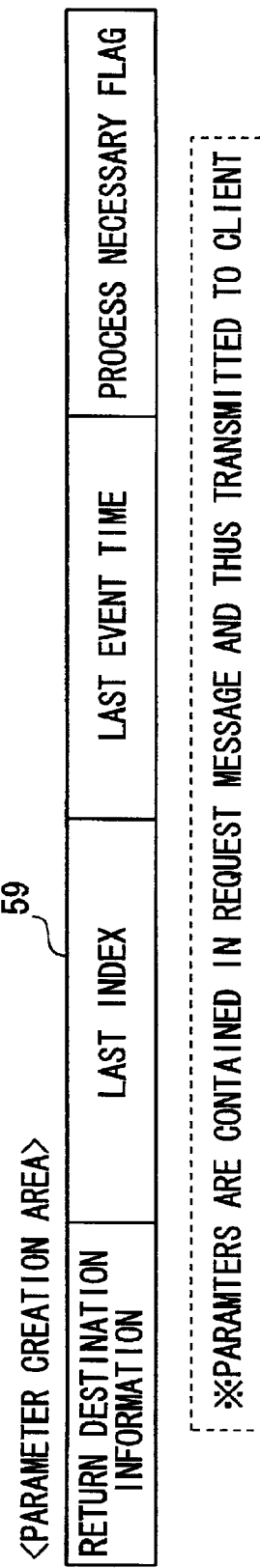

FIG. 21

| REGISTRATION ORDER | INDEX | EVENT REGISTRATION TIME | EVENT TYPE | STATE |
|---|---|---|---|---|
| 0 | 0 | 1998/10/20 12:30:00.00 | ADDITION(GENERATION) OF OBJECT 1 | AS UNLINKED STATE |
| 1 | 1 | 1998/10/20 12:31:00.00 | ADDITION(GENERATION) OF OBJECT 2 | AS UNLINKED STATE |
| 2 | 2 | 1998/10/20 12:32:00.00 | UPDATE OF OBJECT 1 | TO LINKED STATE |
| 3 | 3 | 1998/10/20 12:33:00.00 | UPDATE OF OBJECT 1 | TO DIALOG STATE |
| 4 | 4 | 1998/10/20 12:34:00.00 | UPDATE OF OBJECT 2 | TO LINKED STATE |
| 5 | 5 | 1998/10/20 12:35:00.00 | UPDATE OF OBJECT 2 | TO DIALOG STATE |
| 6 | 6 | 1998/10/20 12:36:00.00 | ADDITION(GENERATION) OF OBJECT 3 | AS UNLINKED STATE |
| 7 | 7 | 1998/10/20 12:37:00.00 | UPDATE OF OBJECT 3 | TO LINKED STATE |
| 8 | 8 | 1998/10/20 12:38:00.00 | UPDATE OF OBJECT 3 | TO DIALOG STATE |
| 9 | 9 | 1998/10/20 12:39:00.00 | UPDATE OF OBJECT 3 | TO UNLINKED STATE |
| 10 | 0 | 1998/10/20 12:40:00.00 | DELETION(DISAPPEARING) OF OBJECT 3 | |
| 11 | 1 | 1998/10/20 12:41:00.00 | UPDATE OF OBJECT 1 | TO UNLINKED STATE |
| 12 | 2 | 1998/10/20 12:42:00.00 | UPDATE OF OBJECT 2 | TO UNLINKED STATE |
| 13 | 3 | 1998/10/20 12:43:00.00 | DELETION(DISAPPEARING) OF OBJECT 1 | |
| 14 | 4 | 1998/10/20 12:44:00.00 | DELETION(DISAPPEARING) OF OBJECT 2 | |

INFORMATION MANAGEMENT SYSTEM

BACKGROUND OF THE INVENTION

1. Field of the Invention

The present invention relates generally to an information management system for providing information under management in response to a request, and more particularly to an information management system for managing state information on states of objects each variable in plural types of states, and providing the state information in response to the request.

2. Description of the Related Art

There has hitherto been known a system in which a server has hitherto managed pieces of information on the states of the objects (which will hereinafter referred to as [state information]), and the state information is provided in response to a request given from a client connected via a network. This system is classified into the following types.

(1) The server retains, as a set of information, plural pieces of state information on the state variations of the objects during a period from a certain point of time up to the present time (in a way that can segment the set of information). Each time the request is received from the client, the client is provided with all pieces of retained state information (First type).

(2) The server retains the state information on the state of the object at the present time as a latest piece of state information, and provides the client with only the latest state information in response to the client's request (Second type).

(3) The server retains, a latest set of state information, the plural pieces of state information on the state variations of the object during a period from a certain point of time to the present time, and also retains a copy of a single piece or plural pieces of state information that have already been provided to the client. When requested from the client, the server compares the latest state information with the copy of the state information, then extracts a different part of information therebetween, and provides the client with this different part of information as difference information (Third type).

There arise, however, the following problems inherent in the systems of the first through third types described above. Namely, according to the first type, the client is provided with all pieces of state information retained by the server. Hence, a quantity of the data transmitted to the client is larger than in the second and third types. Accordingly, a larger load is applied on the network than in the second and third types. Supposing that a transmission speed is the same, there increases a time for the client to obtain the state information from the server.

According to the second type, the server retains only the state information of the object at the present time. Therefore, if the client attempts to obtain all pieces of state information on the state variations of the object, the client must frequently requests the server to provide the state information. Accordingly, there might be a possibility in which the larger load is applied on the network than in the first and third types. Further, if the state variation of the object frequently occurs, even when the client again and again requests the server to provide the state information, the state information on the all the state variations can not be obtained in some cases.

According to the third type, the server retains the copy of the state information provided already to the client in order to create the difference information. Especially when a plurality of clients exist, the serve must retain the copy of the state information with respect to each client. Therefore, a capacity of resource (memory) for retaining the state information must be made larger than in the first and second types. Moreover, if the server manages the state information of the plurality of objects, the server must create and manage the copy of the state information with respect to each client, and hence a tremendous processing load is applied on the server.

SUMMARY OF THE INVENTION

It is a primary object of the present invention to provide an information management system capable of reducing a quantity of state information to be transmitted, and decreasing a time needed for obtaining the state information as compared with the first type described above.

It is another object of the present invention to provide an information management system capable of reducing the number of times with which a request for providing the state information is made, and obtaining the state information on all of state variations of an object as compared with the second type described above.

It is a further object of the present invention o provide an information management system capable of decreasing a storage quantity of data needed for creating difference information, and reducing a management load and a processing load for the state information related to creation of the difference information.

To accomplish the above objects, according to a first aspect of the present invention, an information management apparatus for providing information under management in response to a request comprises an acquisition module acquiring, each time a state of an object variable in plural types of states varies, state information on these state variations, a storage module storing each piece of state information acquired by the acquisition module, and a providing module detecting, when receiving a request for providing the state information from a requester, the state information ranging from a piece of state information indicating that the state varies next to the state information provided last to the requester before receiving the providing request up to a latest piece of state information among pieces of state information stored in the storage module, and providing the requester with the detected state information as difference information.

According to the present invention, the storage module is stored with the respective pieces of state information on the state variations of the object. Therefore, the storage module retains a hysteresis of the state variations of the object. The difference information may be generally defined as information structured such that a latest piece of information, if added to the information in the past, can be obtained. Hence, if the requester has the state information up to a certain point of time among plural pieces of state information stored in the storage module, and if the requester is given the state information as the difference information ranging from a piece of state information indicating that a state varies after (next) that point of time up to a latest piece of state information (stored last in the storage module), the requester is able to obtain the state information on all the state variations occurred till requested this time since the request of the last time. The requester is thereby able to know the latest state and a process leading to this state.

Then, the providing module detects a necessary piece of state information among the plural pieces of state information stored in the storage module, and provides the requester with the detected state information as the difference information in response to a providing request. According to the first aspect, a quantity of the state information to be provided can be therefore restrained smaller than in the first type described above. Further, with the difference information being supplied, the requester is capable of obtaining all pieces of state information on the state variations of the object, and hence the problem inherent in the second type explained above does not arise. Moreover, the difference information that should be provided to each requester can be created by use of the plural pieces of state information stored in the storage module irrespective of the number of requesters. Further, the information management apparatus is not required to retain the copy of the state information as in the third type, and a storage quantity of the data necessary for creating the difference information can be restrained.

The acquisition module may acquire the state information positively (actively) or negatively (passively). A general-purpose processor device such as a CPU, an MPU etc executes a program, whereby the acquisition module and the providing module can be actualized. Further, the acquisition module and the providing module can be also actualized by dedicated hardware (circuits). For example, a semiconductor memory such as a RAM and a ROM, a magnetic disk, a magneto-optic disk, an optical disk, a magnetic tape etc may also be used as the storage module.

According to the present invention, the providing module, when providing the state information to the requester, may provide the requester with specifying information for specifying the latest state information stored in the storage module at that point of time, then detect, when receiving a providing request containing this piece of specifying information from the requester, state information ranging from a piece of state information indicating that the state varies next to the state information specified by the specifying information up to a latest piece of state information, as the state information provided last to the requester, among the pieces of state information stored in the storage module, and provide the requester with the detected state information as the difference information. With this contrivance, the providing module is capable of extracting the necessary piece of state information as the difference information among the plural pieces of state information stored in the storage module on the basis of the specifying information.

According to the present invention, the providing module, if unable to specify the state information that should be specified by the specifying information among the pieces of state information stored in the storage module, may provide the requester with the latest state information stored in the storage module as a substitute for the difference information. With this contrivance, the requester is able to know at least the latest state, and it is not therefore futile that the requester has requested to the information management apparatus to provide the state information.

The present invention can be applied to a server/client system in which the server and the client are connected to each other via a network, and also to interprocess communications between within information devices. If the present invention is applied to the server/client system, the information management apparatus corresponds to the server, while the requester (information request apparatus) corresponds to the client. Further, if the present invention is applied to the interprocess communications, the information management apparatus and the requester (information request apparatus correspond to respective processes that handle the communications.

According to the present invention, there may be provided whatever number of requesters. Namely, according to the present invention, the difference information that should be provided to the requester can be created by use of the state information stored in the storage module irrespective of the number of requesters.

The [object] may be defined as an object generated by the object-oriented programming. This object takes a data structure having values (parameters of attributes) and methods (of behaviors) for reading and writing these values. In addition to this definition, the [object] is variable in plural types of states and may embrace, if state variations thereof can be obtained as pieces of information, processing subjects (e.g., a variety of programs, test data, image data), and control targets (for instance, controllers, sensors and actuators). Whatever number of [objects] may be provided.

Note that when the acquisition module acquires respective pieces of state information of the plurality of [objects], if the plurality of requesters exist and if the objects of which the state information requested by the respective requesters to be provided might differ between the requesters, it is feasible to deal with this situation by providing a plurality of storage modules corresponding to the requesters or by deleting unnecessary pieces of state information out of the difference information on the side of the requesters having made the providing requests.

The [state information] may be defined as information, transferred from the object, about the state variations of the object. The [state information stored next to the state information specified by the specifying information] may be defined as a piece of state information acquired (occurred) by the acquisition module next to the state information specified by the specifying information. The present invention contains such a concept that the [state information stored next to the state information specified by the specifying information] and the [latest state information] might be of the same category in some cases.

BRIEF DESCRIPTION OF THE DRAWINGS:

FIG. 5 is an explanatory diagram showing a format for notifying of a state variation;

FIG. 7 is an explanatory diagram showing a latest state table shown in FIG. 4;

FIG. 9 is an explanatory diagram showing a difference information creation area shown in FIG. 4;

FIG. 10 is an explanatory diagram showing a parameter creation area shown in FIG. 4;

FIG. 21 is a diagram showing variation event records in an operational example of the information management system.

DETAILED DESCRIPTION OF THE PREFERRED EMBODIMENT

An embodiment of the present invention will hereinafter be described with reference to the accompanying drawings. An architectures shown in the embodiment is what is herein exemplified, and the present invention is not limited to this architecture in the embodiment.

<Whole Architecture of Information Management System>

Figure 1:
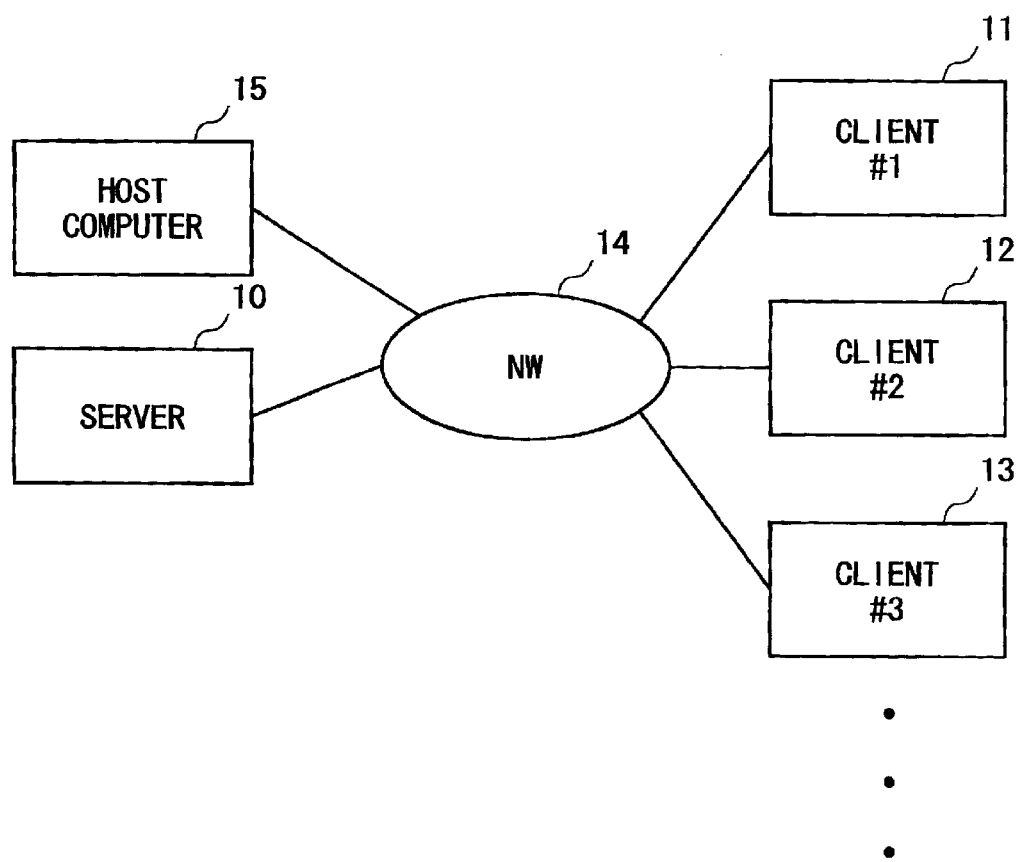
FIG. 1 is a diagram showing a whole architecture of an information management system in an embodiment of the present invention.

FIG. 1 is a diagram showing a whole architecture of an information management system. Referring to FIG. 1, the information management system is configured by a server 10, and a plurality of client terminals (only the client terminals 11~13 are shown by way of an example in FIG. 1 and hereinafter simply referred to as [clients]). The server 10 is connected via a network 14 to the respective clients 11~13. Further, a host computer 15 is connected to the network 14. Note that the server 10 corresponds to an information management apparatus according to the present invention, while each of the clients 11~13 corresponds to an information request device (request side) according to the present invention <Hardware Architecture of Server>

Figure 2:
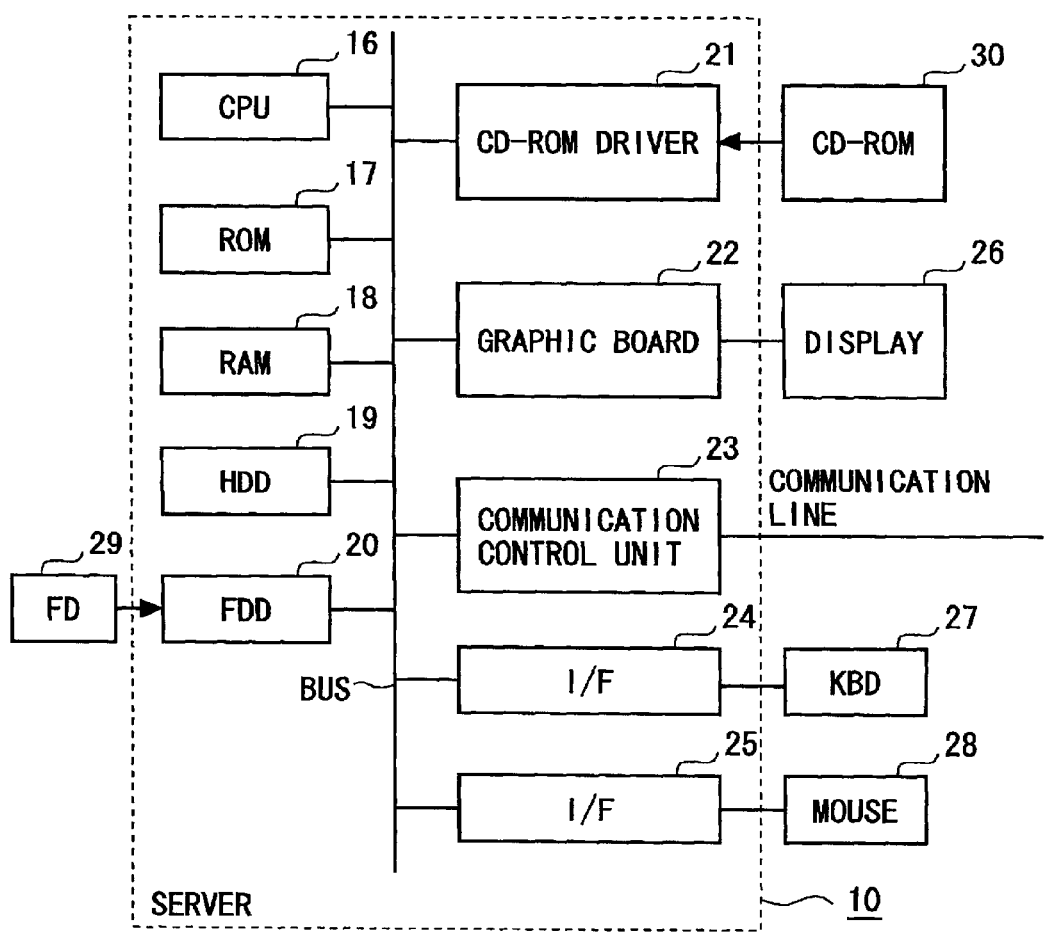
FIG. 2 is a diagram showing a hardware architecture of a server shown in FIG. 1.

FIG. 2 is a diagram showing a hardware architecture of the server 10 shown in FIG. 10. The server 10 includes a CPU (Central Processing Unit) 16, a ROM (Read Only Memory) 17, a RAM (Random Access Memory) 18, a hard disk drive (HDD) 19, a floppy disk drive (FDD) 20, a CD-ROM drive 21, a graphic board 22, a communication control unit 23 and interface (I/F) circuits 24 and 25, which are all connected to each other via a bus BUS.

A display device 41 such as a cathode ray tube (CRT), a liquid crystal display (LCD) etc is connected to the graphic board 22. A keyboard (KBD) 27 is connected to the I/F 23. A mouse 28 or a pointing device such as a trackball, a flat space, a joystick etc is connected to the I/F 24.

A boot program is stored in the ROM 17. The boot program is executed by the CPU 16 when switching ON a power source of the server 10. An operating system (OS) and a variety of drivers for executing display processes and communication processes, which are stored in the HDD 19, are downloaded into the RAM 18, thereby coming to a state where the variety of processes and control become executable.

A program for controlling the server 10 is developed on the RAM 18. The RAM 18 is an operation area used for the CPU 16 to retain results of control-program-based processes, temporary pieces of data for processing and display data for displaying a result of processing on a screen of the display 26.

The display data developed on the RAM 18 are transferred via the graphic board 22 to the display 26. The display 26 displays display elements corresponding to the display data on its screen.

The HDD 19 and the FDD 20 are devices for recording or reading, based on indications of the CPU 16, a program, control data, text data, image data etc on or from the recording mediums (the hard disk and the floppy disk 29) corresponding thereto.

The CD-ROM drive 21 is a device for reading the program and the data recorded on the CD-ROM (the Read-Only Memory using a compact disk) 24 in accordance with the indication of the CPU 16.

The communication control unit 23, based on the indications of the CPU 16, transmits and receives the data to other devices by use of communication lines connected to the server 10, or executes downloading of the program and the data.

The KBD 27 has a plurality of keys (character input keys, cursor keys, etc), and is used for an operator to input the data to the server 10. The mouse 28 is used for inputting an indication of selection using a mouse cursor displayed on the display 26.

The CPU 16 executes a variety of programs stored on the ROM 17, the HDD 19, the FD 29 and the CD-ROM 30, thereby actualizing the present invention note that the programs and the data retained on the recording mediums such as the HDD 19 etc may also be stored beforehand, and the programs and the data downloaded from other devices may also be stored on the HDD 19.

Note that the CPU 16 executes the programs, whereby the server functions as the information management apparatus including an acquisition module, a storage module and a providing module. Further, the RAM 18 corresponds to a storage unit (storage device) according to the present invention. Moreover, the RAM 18, the ROM 17, the HDD 19, the FD 29 and the CD-ROM 30 correspond to recording mediums according to the present invention.

<Hardware Architecture of Client>

Figure 3:
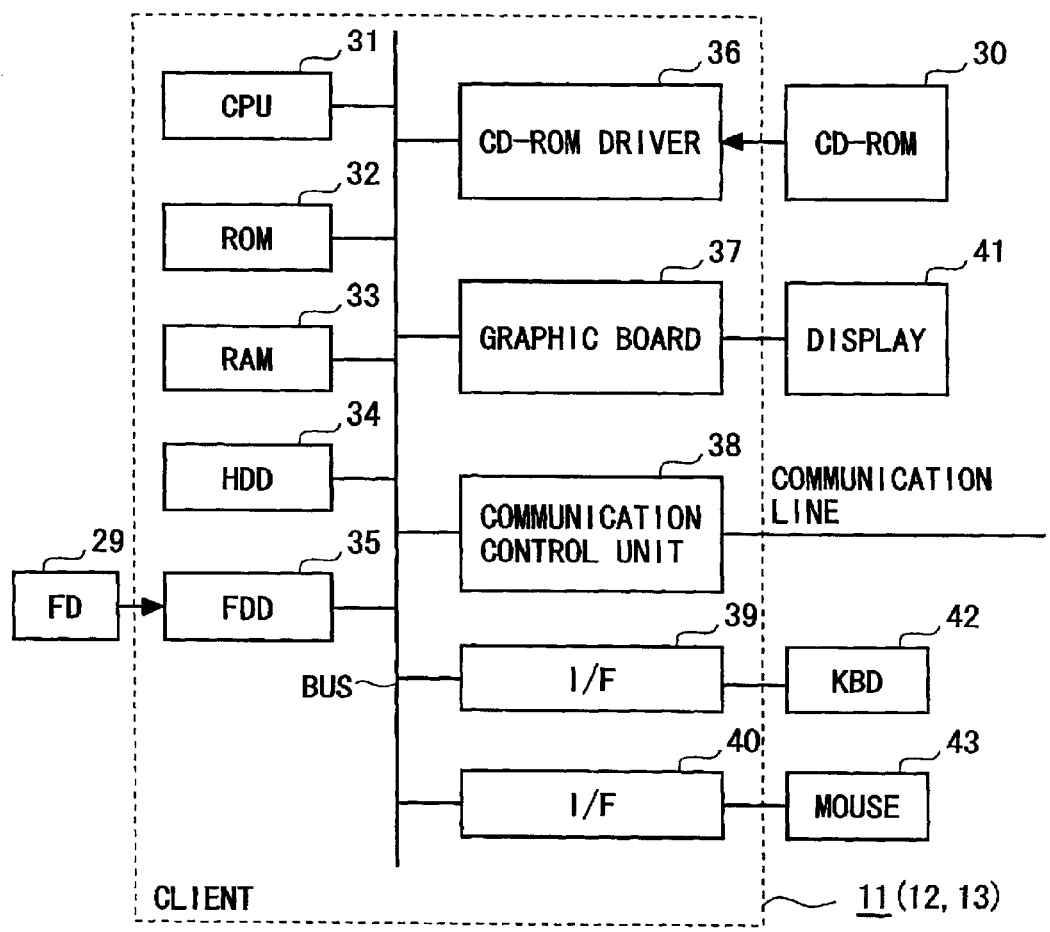
FIG. 3 is a diagram showing a hardware architecture of a client shown in FIG. 1.

FIG. 3 is a diagram showing a hardware architecture of each of the clients 11~13 shown in FIG. 1. The clients 11~13 have the same architecture, and hence only the client 11 is illustrated by way of an example in FIG. 3.

Referring to FIG. 3, the client 11 includes a CPU 31, a ROM 32, a RAM 33, an HDD 34, an FDD 35, a CD-ROM drive 36, a graphic board 37, a communication control unit 38 and I/Fs 39, 40, which are all connected to each other via the bus BUS. The display device 41 such as the CRT, the LCD etc is connected to the graphic board 22. A keyboard (KBD) 42 is connected to the I/F39. A mouse 43 or the pointing device such as the track ball, the flat space, the joystick etc is connected to the I/F 40. As described above, the client 11 has the same hardware architecture as the server 10, and therefore explanations of the components of the client 11 are herein omitted.

<Functions of Information Management System>

Figure 4:
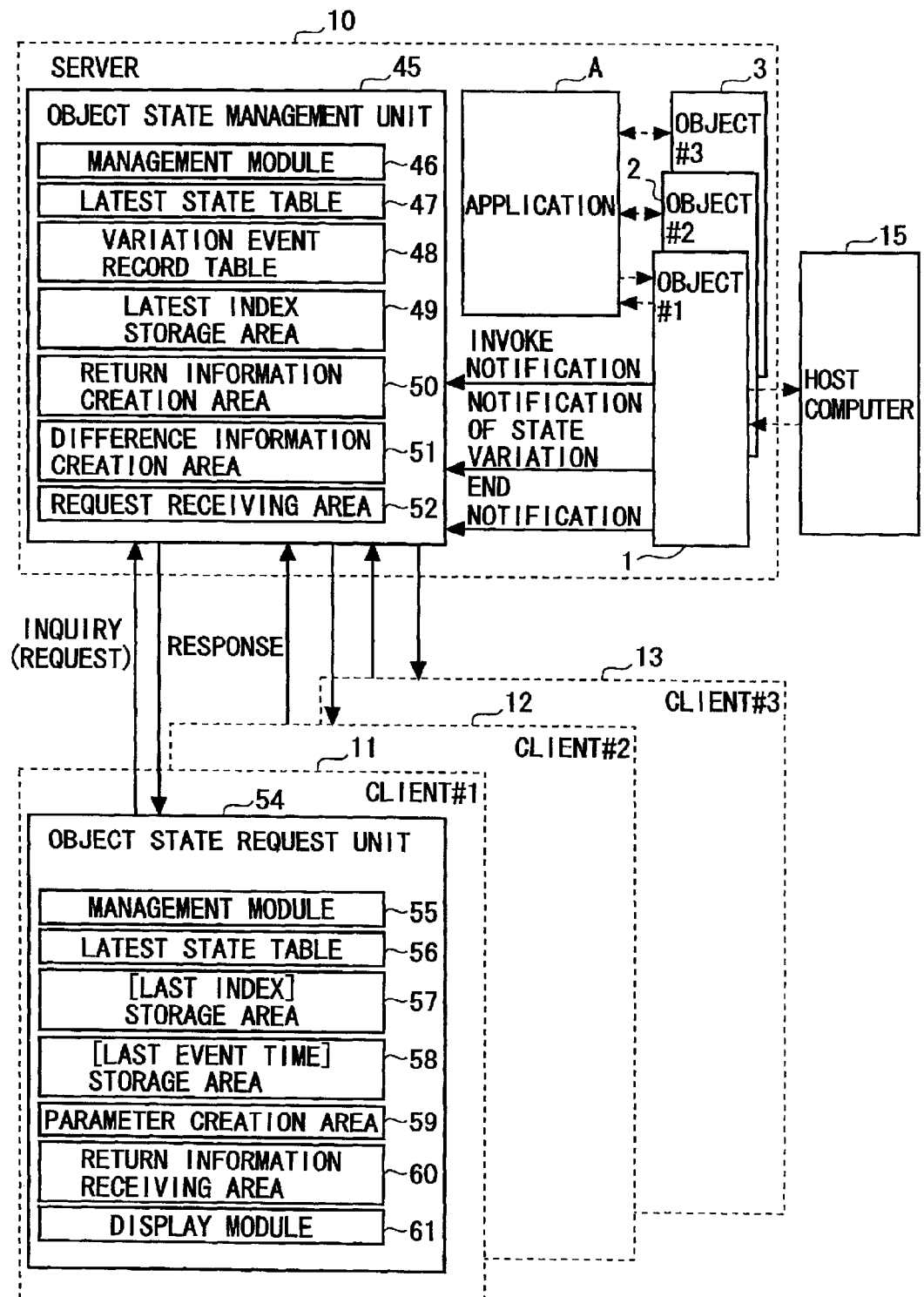
FIG. 4 is a diagram showing function blocks of the information management system shown in FIG. 1.

FIG. 4 is a block diagram showing functions of the information management system shown in FIG. 1. The server 10, when the CPU 16 shown in FIG. 2 executes the programs, functions as a device constructed of functions (modules) in a function block shown in FIG. 4, thereby actualizing the present invention. Similarly, each of the clients 11~13, when the CPU 31 shown in FIG. 3 executes the programs, functions as a device illustrated as if existing always in FIG. 4, appear and disappear as the necessity may arise.

Each of the objects 1~3 gives a message of a variation event to an object state management unit 45. The message of the variation event consists of an invoke notification, a state variation notification and an end notification. Each of the objects 1~3, when the object itself is invoked, gives the invoke notification to the object state management unit 45. Further, each of the objects 1~3, when a state of the object itself varies, gives the state variation notification to the object state management unit 45. Each of the objects 1~3, when a process related to the object itself finishes, gives the end notification to the object state management unit 45.

The object state management unit 45 includes a management module 46, a latest state table 47, a variation event record table 48, a latest index storage area 49, a return information creation area 50, a difference information creation area 51 and a request receiving area 52.

This management module 46 corresponds to the acquisition module and the providing module according to the present invention. the variation event record table 48 corresponds to the storage module according to the present invention. the latest state table 47 corresponds to a latest state retaining module. The latest index storage area 49 corresponds to a latest index retaining module according to the present invention.

FIG. 5 is an explanatory diagram showing a format of the variation event message given to the object state management constructed of functions (modules) in a function block shown in FIG. 4. The information management apparatus, the information management system and an information providing method according to the present invention, are thereby actualized.

<<Functions of Server>>

Referring to FIG. 4, the server 10 functions as the device including an object state management unit 45 and a plurality of objects (of which only objects 1~3 are illustrated by way of an example in FIG. 4 and correspond to [objects (components)] according to the present invention).

Namely, the server 10 manages states of the objects 1~3. The server 10 provides, in response to an inquiry (request) from each of the clients 11~13, the inquirer client with information (state information) on state variations of the objects 1~3.

Each of the objects 1~3 may be defined as a software component of the program taking a data structure having values (parameters of attributes) and methods (of behaviors) for reading and writing these values. The object is invoked (created) based on an indication of application (which may be defined as a function actualized by executing an application program), and predetermined methods are executed.

When executing this method, each of the objects 1~3 varies in a plurality of states. Thereafter, when not required with an end of the method, each of the objects 1~3 finishes (disappears). Accordingly, the objects 1~3, though unit 45 from each of the objects 1~3. As shown in FIG. 5, the variation event message is structured of data storage fields such as an [object name] field, an [event type] field, a [state] field and an [event occurred time] field.

The [object name] maybe defined as data indicating a name of the object where an event occurs, and this object name distinguishable from other objects is selected. The [event type] is data indicating a type of the event. The event type contains [add], [update] and [delete] of the object.

If the variation event message is the invoke notification, the event type is [add]. If the message is the state variation notification, the event type is [update]. If the message is the end notification, the event type is [delete].

The [state] may be defined as data indicating a state of the object after the event has occurred. If the [event type] is [add] (if the message is the invoke notification), an initial state of the object is stored in the [state] field. Further, if the [event type] is [update] (if the message is the state variation notification), a state of the object after being updated is stored in the [state] field. Further, if the [event type] is [delete] (if the message is the end notification), "0" or an null character string is stored in the [state] field. The [event occurrence tome] is data showing a time when the event occurs and treated as sub-data.

Figure 6:
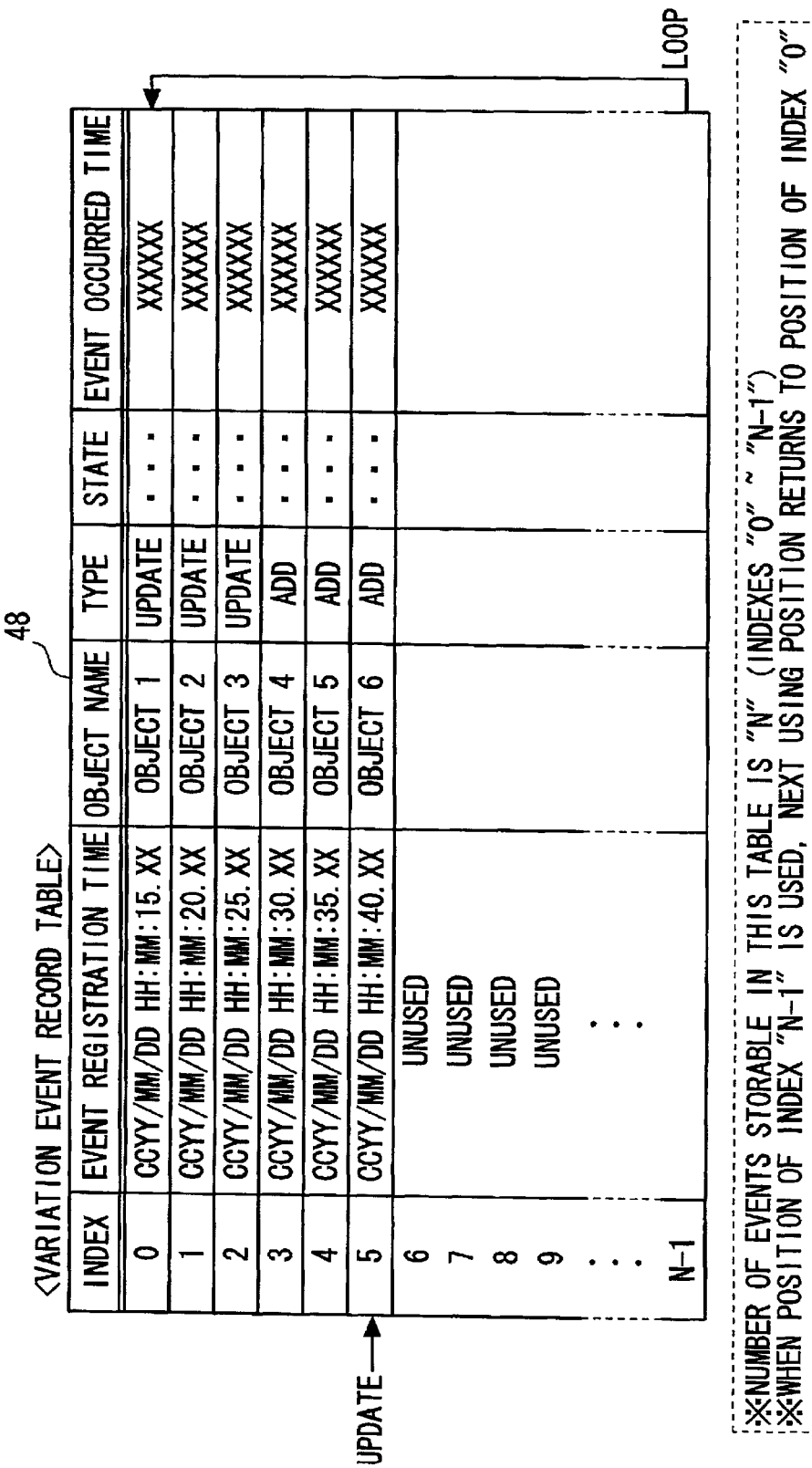
FIG. 6 is an explanatory diagram showing a variation event record table shown in FIG. 4.

FIG. 6 is a diagram showing an example of the variation event record table 48. The variation event record table 48 consists of records of variation events (which will hereinafter be called [variation event records]) of which the objects 1~3 have notified, the records being stored in an occurring sequence (in an acquiring sequence of the object state management unit 45). Thus, the variation event record table 48 retains a hysteresis of the variation events.

As shown in FIG. 6, the variation event record consists of pieces of data of [registration time], [object name], [type] of event, [state] of event and [event occurred time]. This variation event record corresponds to state information according to the present invention.

The [event registration time] is data indicating a time when the variation event record is stored in the variation event record table. The [object name], [type], [state] and [event occurred time] are the same pieces of data as those explained about the variation event message.

The variation event record table 48 takes a ring buffer structure. To be specific, the variation event record table 48 has a plurality of areas ranging from a top area down to a bottom area. Each variation event record is stored in each area.

The variation event record table 48 has a capacity enough to store N-pieces of variation event records at the maximum. Index numbers (corresponding to index information) of "0" through "N−1" are allocated to the areas. The variation event record stored in each area is given the index number allocated to its area.

The variation event records are stored sequentially from the top area (with the index number "0") down to the bottom area (with the index number "N−1"). When the variation event record is stored in the bottom area (when the area "N−1" is occupied), a next variation event record is looped back to and overwritten in the top area (with the index number "0"). Thereafter, the variation event records subsequent thereto are sequentially overwritten in the order of the index numbers.

Note that the variation event record table 48 is configured in such a size that the index number does not make one round if stored with a multiplicity of variation event records at an arbitrary time. This structure prevents a possibility in which the latest index can not be drawn out of the event registration time due to the one-round shift of the index number. Further, the variation event record stored at an arbitrary time is prevented from being overwritten by other variation event record stored at the same time.

Referring back to FIG. 4, the latest index storage area 49 retains the index number corresponding to the variation event record stored last in the variation event record table 48.

FIG. 7 is an explanatory diagram showing the latest state table 47 shown in FIG. 4. Referring to FIG. 7, the latest state table 47 retains the latest states of the objects 1~3. Namely, the latest state table 47 retains records each showing the latest state of each of the objects 1~3, and each containing [object name], [state] and [last event occurred time].

The [last event occurred time] is a piece of data indicating an event occurred time of the event [add] or [update] or [delete] occurred last with respect to the object. The [object name] and the [state] are the same as those contained in the variation event record table 48. Each of the records stored in the latest state table 47 is updated each time the object corresponding to each record notifies of the variation event message.

Figure 8:
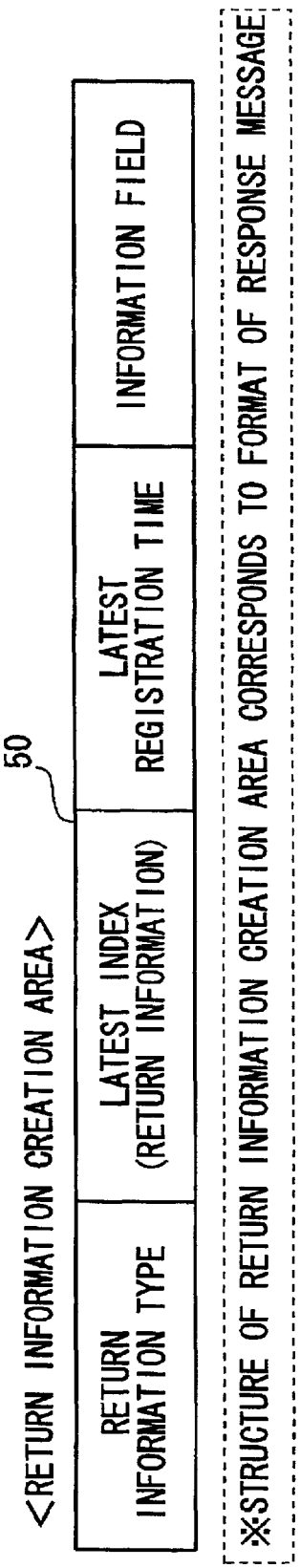
FIG. 8 is an explanatory diagram showing a return information creation area shown in FIG. 4.

Referring back to FIG. 4, the return information creation area 50 is used for editing a response message to an inquiry (which is a request message corresponding to a providing request according t the present invention) from each of the clients 11~13. FIG. 8 is an explanatory diagram showing the return information creation area 50 of which a structure corresponds to a format of the response message.

Referring again to FIG. 8, the return information creation area 50 consists of fields for storing pieces of data such as [return information type], [latest index (return information)] and [latest registration time], and an information field. The [return information type] is data for judging whether the information stored in the information field is [difference information] of [real information]. The [latest index] is data indicating the index number in the variation event record table 48, and is specified for the client to receive the [difference information] from the server 10 when making a next request. If the return information type indicates the [difference information], the index number allocated to the latest variation event record among the variation event records in the variation event record table 48 which are used for creating the [difference information], is set as the [latest index].

While on the other hand, if the [return information type] is the [real information], the index number stored in the latest index storage area 49 at the present time is set as the [latest index]. If any variation event records are not stored at all in the variation event record table 48, however, for example, "–1" (any numbers excluding those used as the index numbers may be used) as a substitute for the index number is set as the [latest index].

The [latest registration time] is data indicating a time when the variation event record is registered last in the variation event record table 48. The area stored with the variation event record recorded last in the variation event record table 48 (which area corresponds to a position of the index number given to the variation event record registered last), will hereinafter be referred to as a [latest index position].

The [latest registration time] is specified for the server 10 to judge whether or not the client is capable of creating the [difference information] when making the next request. Note that if the [latest index] in the response message is "–1", this shows that the server 10 has no data corresponding to the [latest registration time]. In this case, the [latest registration time] in the response message turns out to be null data.

The information field is, if the [return information type] indicates the [real information], stored with all the records in the latest state table 47. By contrast, if no record is stored in the latest state table 47, a piece of information indicating this purport (which is herein expressed by "nothing") is stored in the information field.

While on the other hand, if the [return information type] indicates the [difference information], the information field is stored with a chain of difference variation events (corresponding to difference information according to the present invention). The difference variation event chain consists of a single or a plurality of variation event records starting from the variation event record registered in the variation event record table 48 next to the variation event record provided last to the client having made the request and ended with the variation event record registered last. The variation event records that form the difference variation event chain, are stored in the order of index numbers in the information field. Note that the difference variation event chain corresponds to [a set of state information ranging from the state information indicating a state varied next to the state information provided last to the requester before receiving the providing request, to the latest state information] If each of the clients 11~13, when inquiring, sets a [process necessary flag] that will hereinafter be explained to [unnecessary], the information field is stored with a subset of information (corresponding to extracted information) obtained by removing, from the difference variation event chain, pieces of information unnecessary for generating the latest state of each object.

Further, if the state of each of the objects 1~3 remains unchanged when making the request this time and when having made the request last time, the [difference information] does not exist. In this case, the information showing that there is no [difference information] (this is herein expressed by "nothing"), is stored in the information field.

Referring back to FIG. 4, the difference information creation area 51 may be defined as a work area and used, when creating the [difference information] stored in the information field of the return information creation area 50, for extracting necessary pieces of variation event records from the variation event records stored in the variation event record table 48.

FIG. 9 is an explanatory diagram showing the difference information creation area 51. As shown in FIG. 9, the difference information creation area 51 is stored with the [object name], the [event type], the [state], the [event occurred time], and an [event unnecessary flag].

The [event unnecessary flag] is a flag for showing whether or not the client needs the records stored in the difference information creation area 51 if the data indicting a process from a state of each object received last by the client up to the latest state of each object, is not required. This flag takes a value indicating [necessary] or [unnecessary]. The data in the fields such as the [object name], the [event type], the [state] and the [event occurred time], are of the same categories as those of the data explained about the variation event records.

Note that the difference information creation area 51 is stored with the difference variation event chain itself detected from the variation event record table 48 in this embodiment. As a substitute for this structure, the difference information creation area 51 may consist of an index field of the indexes of the respective variation event records contained in the difference variation event chain, and an event unnecessary flag field of the flags with respect to these indexes. The event unnecessary flag may be set referring to the variation event record table 48 in accordance with the indexes, and the variation event record in which the event unnecessary flag is set to [necessary] may be transferred to the return information creation area 50 from the variation event record table 48.

Referring back to FIG. 4, the request receiving area 52 is stored with messages from the objects 1~3 and messages from the clients 11~13.

The management module 46 manages and controls the latest state table 47, the variation event record table 48, the latest index storage area 49, the return information creation area 50 and the difference information creation area 51 in accordance with the messages received from the objects 1~3 and the messages received from the clients 11~3. The process by this management module 46 will be described later on.

Note that the CPU 16 shown in FIG. 2 executes the program, thereby actualizing by the management module 46 as a function. The latest state table 47, the variation event record table 48, the latest index storage area 49, the return information creation area 50, the difference information creation area 51 and the request receiving area 52 are created on the RAM 18 by the CPU 16 executing the program.

<<Functions of client>>

Referring to FIG. 4, each of the clients 11~13 functions as a device including the object state requesting unit 54. More specifically, each of the clients 11~13 requests the server 10 to provide the state information of the objects 1~3 as the necessity may arise, obtains the state information corresponding to this request message from the server 10, and notifies a client user of the latest states of the objects 1~3.

The followings are contrivances for notifying the user. For instance, data about the state information may be displayed on the display device or may be optically indicated (by lightening of a lamp) or may be recognized by sounds or may be perceived by an air flow and vibrations. Namely, the data about the state information may be recognized by the user through the five senses.

Further, each of the clients 1~3, when provided with plural pieces of state information from the information management apparatus described above, the user of the information request device may be notified of the data about the state information. In this case, the data about the plural pieces of state information may be displayed on the display device, and may also be displayed in sequence from the older on the display device.

The object state requesting unit 54 includes a management module 55, a latest state table 56, a [last index] storage area 57, a [last event time] storage area 58, an inquiry parameter creation work area (which will hereinafter be simply expressed as a [parameter creation area]) 59, a return information receiving area 60 and a display module 61.

The latest state table 56 takes the same structure as the latest state table 47 of the server 10 (see FIG. 7).

The storage area 57 retains the index numbers stored as the [latest index] in the response message (see FIG. 8) received from the server 10. The index number stored in the storage area 57 is specified as a parameter when making the inquiry next time, and is used for the client to receive the [difference information] (containing the subset of information) based on the variation event records after this index number.

The storage area 58 retains the data of the registration time stored as the [latest registration time] in the response message (see FIG. 8) received from the server 10. The data of the registration time stored in the storage area 58 is specified as a parameter when making the inquiry next time, and is used for checking a validity of the index number corresponding to this piece of data of the registration time.

The parameter creation area 59 may be defined as a work area for creating the parameter specified when each of the client 11~13 requests the server 10 for the state information. FIG. 10 is an explanatory diagram of the parameter creation area 59. As shown in FIG. 10, the parameters specified when requesting the object information consist of a piece of [return destination information], a [last index], a [last event time] and a [process necessary flag]. These parameters are contents of the request message transmitted to the server 10 from each client.

The [return destination information] is the parameter for specifying a destination of a response message to the request message. The [last index] is an index number corresponding to the latest variation event record in the variation event record table 48 obtained from the response message to the last request, and the index number stored in the [last index] storage area 57 is specified.

The [last event time] is an event registration time corresponding to the latest variation event record in the variation event record table 48 that is obtained from the rely message to the last request, and the event registration time stored in the [last event time] storage area 58 is specified.

The [process necessary flag] is a flag for specifying whether or not a process of the state variation is necessary other than the latest state of each of the objects 1~3 by showing setting [necessary] or [unnecessary].

If [unnecessary] is specified, and when the response message is created, an unnecessary record removing process of the [difference information] which will be explained later on and a size judging process, are executed in the server 10.

Referring back to FIG. 4, the return information receiving area 60 is an area for storing the response message received from the server 10. The display module 61 displays the contents retained in the latest state table 61. The user (operator) of the client can be thereby notified of the information on the variation event record (state information) The management module 55, based on an indication of the operator of the client, manages and controls the latest state table 56, the storage areas 57 and 58, the parameter creation area 59, the return information receiving area 60 and the display module 61. The process by this management module 55 will be described later on.

Note that the management module 55 may be defined as a function actualized by the CPU 31 executing the program, which is shown in FIG. 3. The latest state table 56, the storage areas 57 and 58, the parameter creation area 59 and the return information receiving area 60, are created on the RAM 33 by the CPU 31 executing the program. Further, the graphic board 22 shown in FIG. 3 displays the contents retained in the latest state table 56 on the display device 26 in accordance with a command given from the CPU 31, whereby the display module 61 is actualized.

<<Processes in Server>>

Next, the processes in the server 10 will be explained referring to FIGS. 4~15. FIGS. 11~15 are flowcharts showing the processes (by the management module 46 of the object state management unit 45) in the server 10.

As a premise of the processing by the management module 46, the latest state table 47 has the areas enough to stored the records about all the objects. Further, a maximum number N of the variation event records storable in the variation event record table 48, is defined as "MAX_EVENT". Accordingly, the index numbers for specifying the variation event records in the variation event record table 48 are "0"~"MAX_EVENT-1".

Figure 11:
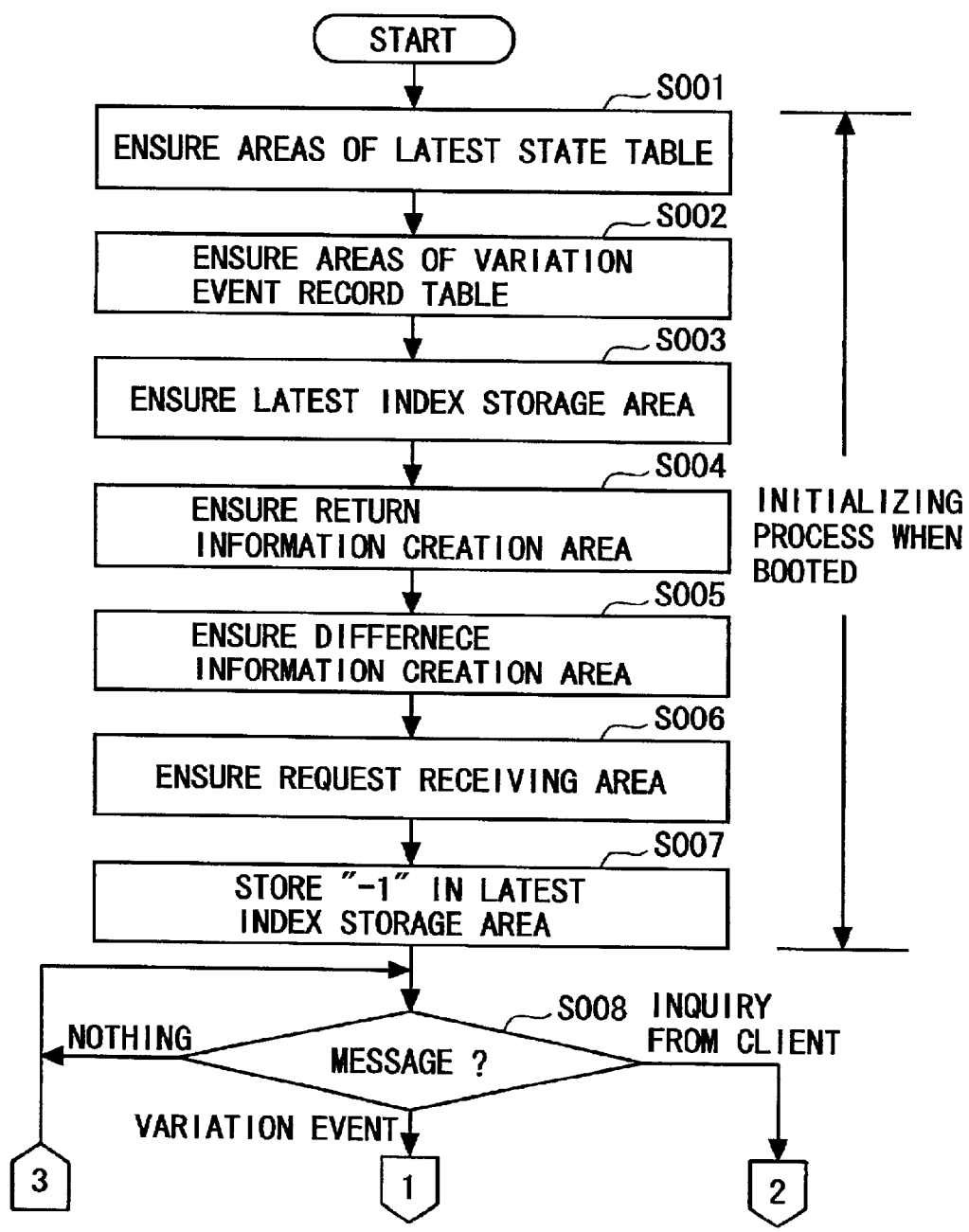
FIG. 11 is a flowchart showing processes in a server.

In FIG. 11, the management module 46 shown in FIG. 4 starts processing, e.g., upon switching ON an unillustrated power source of the server 10. To begin with, the management module 46 executes an initializing process when booted in S001~S007.

That is, the management module 46 ensures, on the RAM 18, the areas of the latest state table 47, the areas of the variation event record table 48 and the latest index storage area 49 each having a sufficient size (S001, S002, S003).

Subsequently, the management module 46 ensures the return information creation area 50, the difference information creation area 51 and the request receiving area 52 each having a sufficient size (S004, S005, S006).

Thereafter, the management module 46 stores the latest index storage area 49 with "−1" as the [latest index] (S007).

Upon an end of the initializing process when booted, the management module 46 waits the message (the variation event message or the inquiry (request message) from the client) from each of the objects 1~3 or each of the clients 11~13. At this time, the management module 46, when receiving the message of the variation event, advances the processing to S009 shown in FIG. 12.

Figure 12:
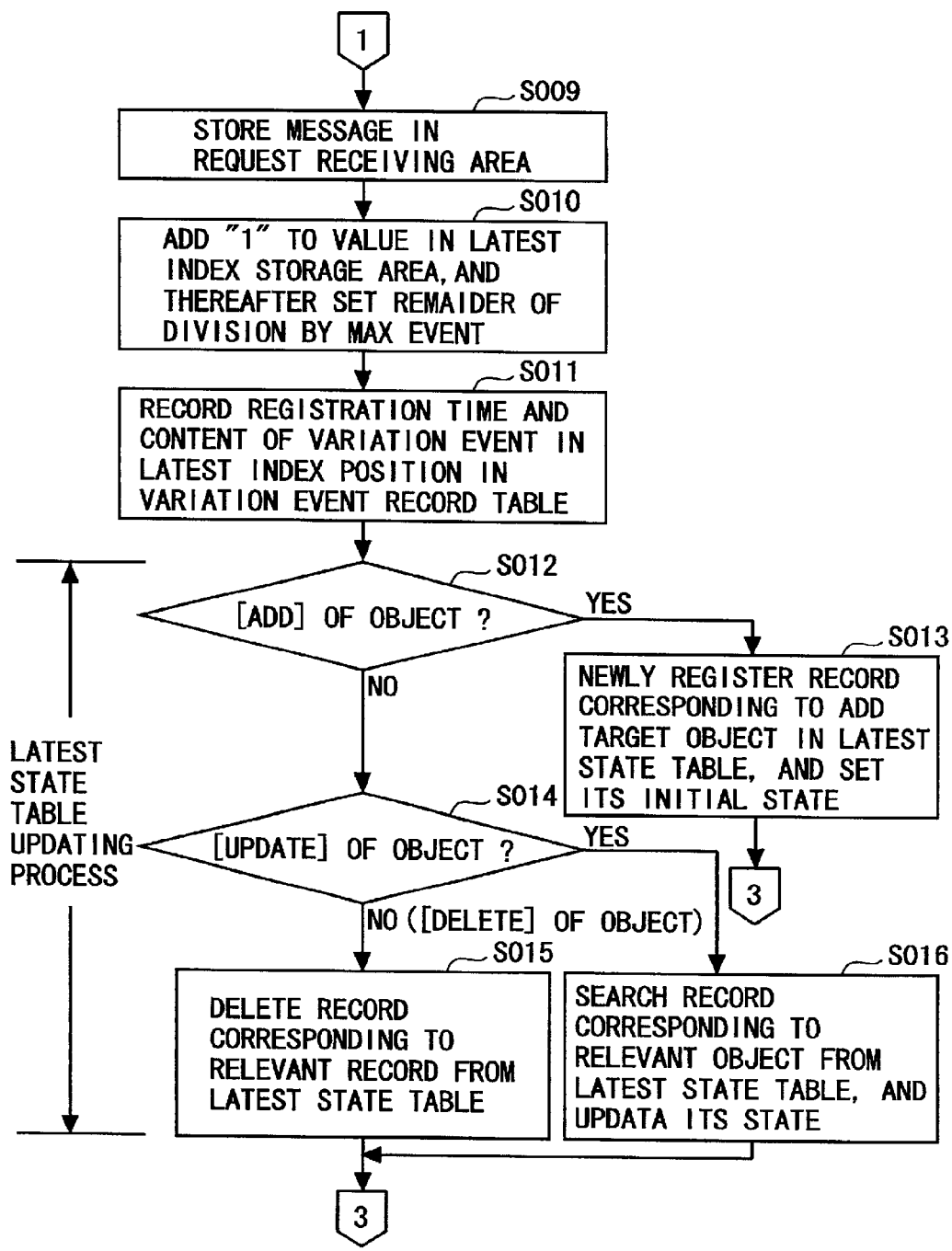
FIG. 12 is a flowchart showing the processes in the server.

Referring to FIG. 12, in S009, the management module 46 stores the received message (see FIG. 5) of the variation event in the request receiving area 52.

In S010, the management module 46 registers the variation event record (consisting of the [object name], the [(event) type], the [state] and the [event occurred time]) corresponding to the message of the variation event stored in the request receiving area 52, in an area next to the area stored with the variation event record registered last at the present time in the variation event record table 48 (see FIG. 6). At the same time, the management module 46 registers a time at this moment as the [event registration time]. The area stored with the variation event record registered afresh comes to the latest index position.

In S012~S106, the management module 46 executes a latest state table updating process. Namely, the management module 46 judges whether the [type] of the variation event record registered newly in the variation event record table 48 is [add] or not (S012).

At this time, if the [type] is [add] (S012; Y), the management module 46 newly stores the latest state table 47 with the [object name] and [event occurred time] in the variation event record registered in S011. At the same time, the management module 46 stores an initial state of this object as the [state] (s013). Thereafter, the management module 46 loops the processing back to S008 in FIG. 11.

Whereas if the [type] in the variation event record is not [add] (S012; N), the management module 46 judges whether the [type] corresponding to the latest index is [update] or not (S014).

At this time, if the [type] is not [add] (S014; N), the management module 46 deems that the [type] is [delete], the record with a coincidence of the [object name] of the variation event record is deleted from the latest state table 47 (S015) and thereafter the processing is looped back to S008 in FIG.

By contrast, if the [type] is [update], the record with the coincidence of the [object name] of the variation event record is searched from the latest state table 47, and the [state] in the searched record is updated with the [state] in the variation event record (S016). Thereafter, the processing is looped back to S008 in FIG. 11.

Figure 13:
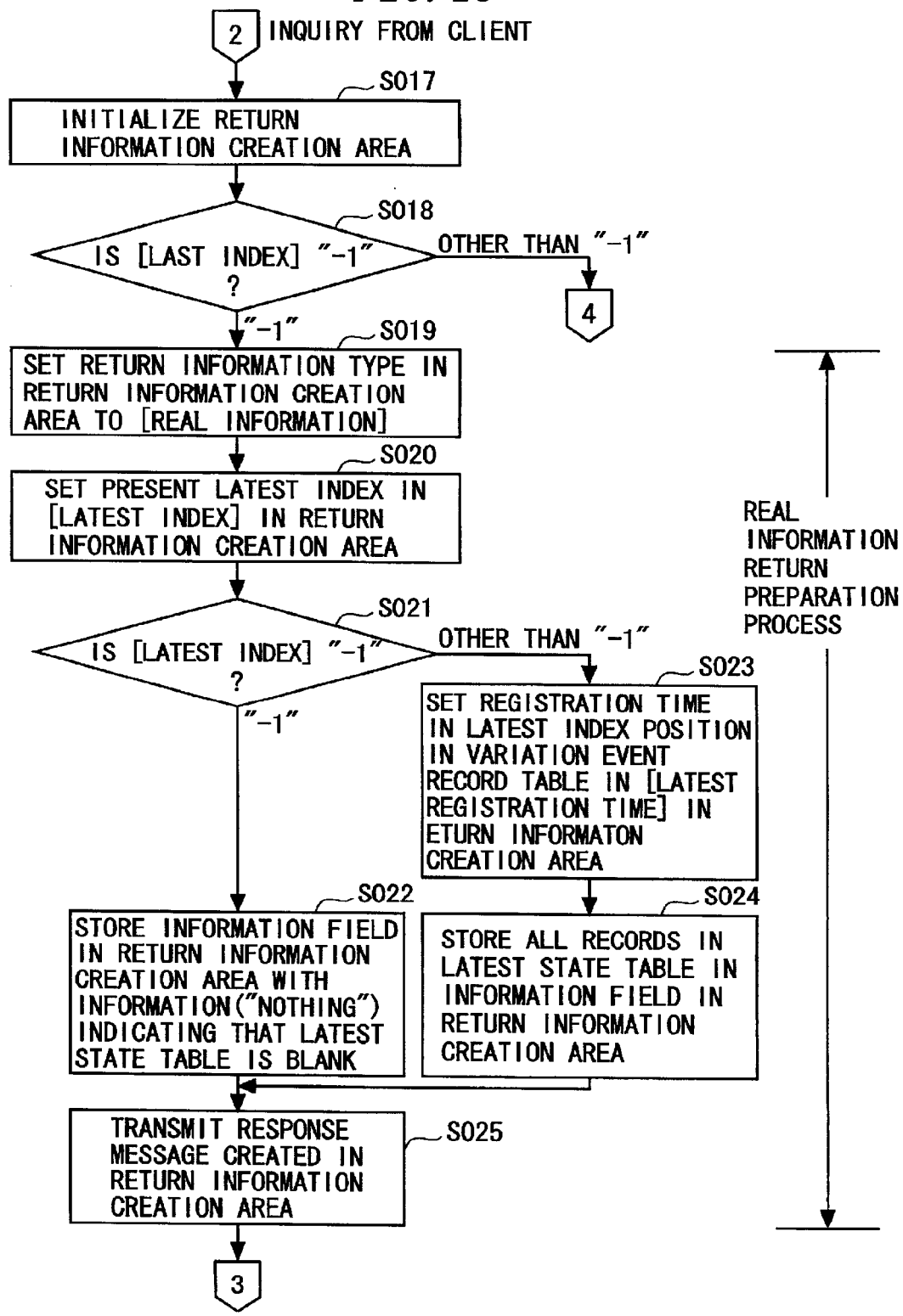
FIG. 13 is a flowchart showing the processes in the server.

Referring back to FIG. 11, in S008, the management module 46, when receiving the inquiry (request message) from the client, advances the processing to S017 in FIG. 13.

In S017, the management module 46, upon receiving the request message (see FIG. 10) in the request receiving area 52, initializes the return information creation area 50 (see FIG. 8).

In S018, the management module 46 judges whether or not the [last index] in the request message received in the request receiving area 52 is "−1". At this time, if the [last index] is "−1", the processing proceeds to S019. If other than "−1", the processing proceeds to S026 in FIG. 14.

In S019~S025, the management module 46 executes a real information return preparation process. To be specific, the management module 46 sets a piece of [real information] in a [return information type] in the return information creation area 50 (S019).

Next, the management module 46 sets, in the [latest index] in the return information creation area 50, the latest index number stored in the latest index storage area 49 at the present (S020).

Next, the management module 46 judges whether or not the latest index set in S020 is "−1" (S021). In this case, if the latest index is "−1", the processing proceeds to S022. If other than "−1", the processing goes forward to S023.

When the processing proceeds to S022, the management module 46 stores the information field in the return information creation area 50 with a piece of information ("nothing") showing that no information is stored in the latest state table 47, and advances the processing to S025.

When the processing proceeds to S023, the management module 46 sets, in the [latest registration time] in the return information creation area 50, a registration time of the variation event record stored in the latest index position in the variation event record table 48. Subsequently, the management module 46 stores the information field in the return information creation area 50 with all the records stored in the latest state table 47 (S024). Thereafter, the management module 46 advances the processing to S025.

Through the processes in S019~024, the response message is created in the return information creation area 50. In S025, the response message created is delivered to a destination corresponding to the [return destination information] in the request message received (stored) in the request receiving area 52. Thereafter, the processing returns to S008 in FIG. 11.

Figure 14:
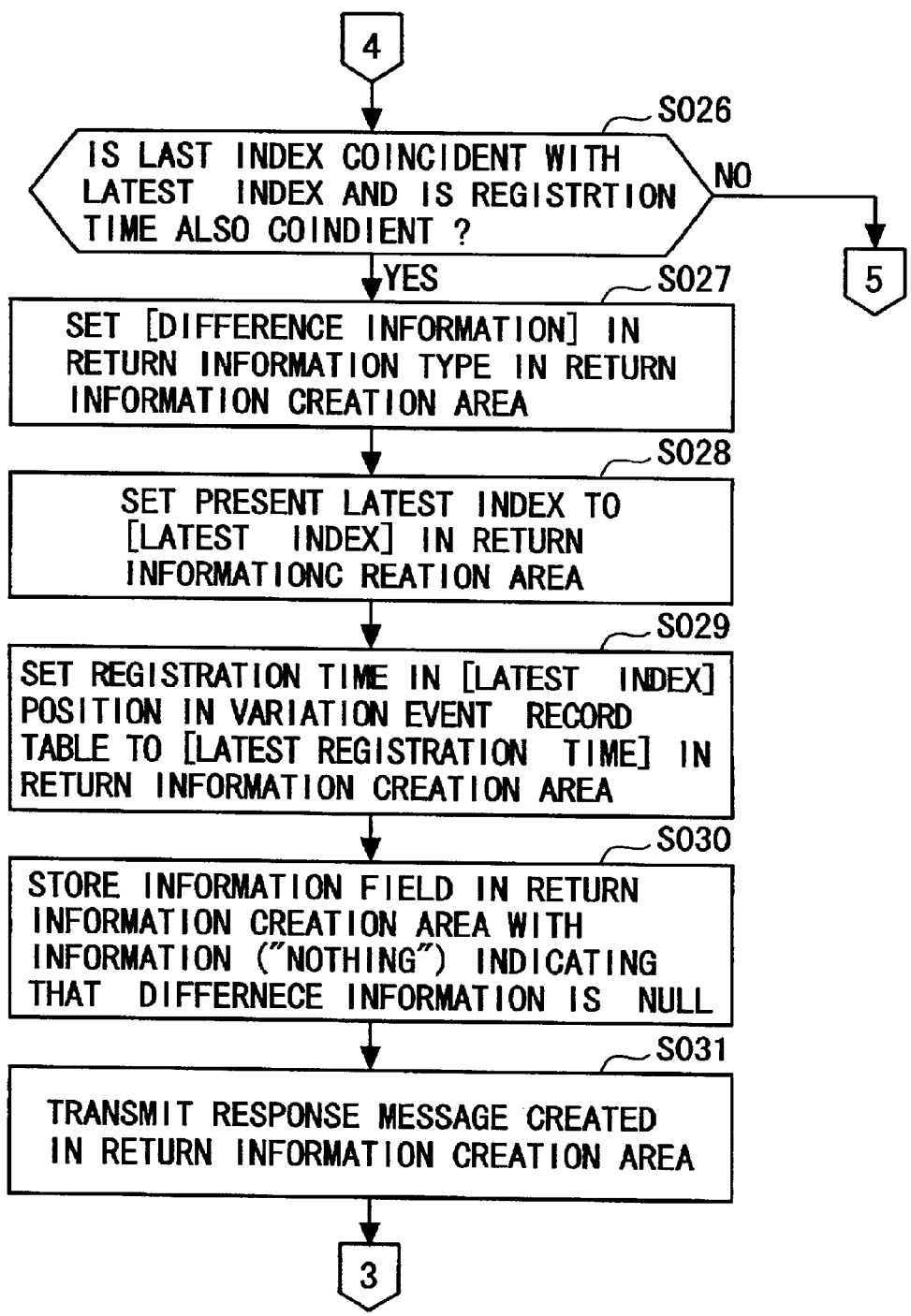
FIG. 14 is a flowchart showing the processes in the server.

On the other hand, hen the processing proceeds to S026 in FIG. 14, the management module 46 judges whether or not a value of the [last index] in the request message stored in the request receiving area 52 is coincident with the value stored in the latest index storage area 49, and whether or not the [last event time] in the request message is coincident with the event registration time in the latest index position in the variation event record table 48. At this time, if both of the values and times are coincident with each other, the processing proceeds to S027. Whereas if not coincident, the processing goes to S032 shown in FIG. 15.

When the processing proceeds to S027, the management module 46 sets the [difference information] in the [return information type] in the return information creation area 50. Next, the management module 46 sets, in the [latest index] in the return information creation area 50, a value (index number) in the latest index position of the variation event record table 48 at the present (S028).

Next, the management module 46 sets, in the [latest registration time] in the return information creation area 50, the [event registration time] stored in the latest index position in the variation event record table 48 (S029).

Next, the management module 46 stores the information ("nothing") indicating that no [difference information] exists in the information field in the return information creation area 50 (S030). The response message is created by the processes in S027~S030. Thereafter, the management module 46 delivers the response message created to a destination corresponding to the [return destination information], and then loops the processing back to S008 in FIG. 11.

Figure 15:
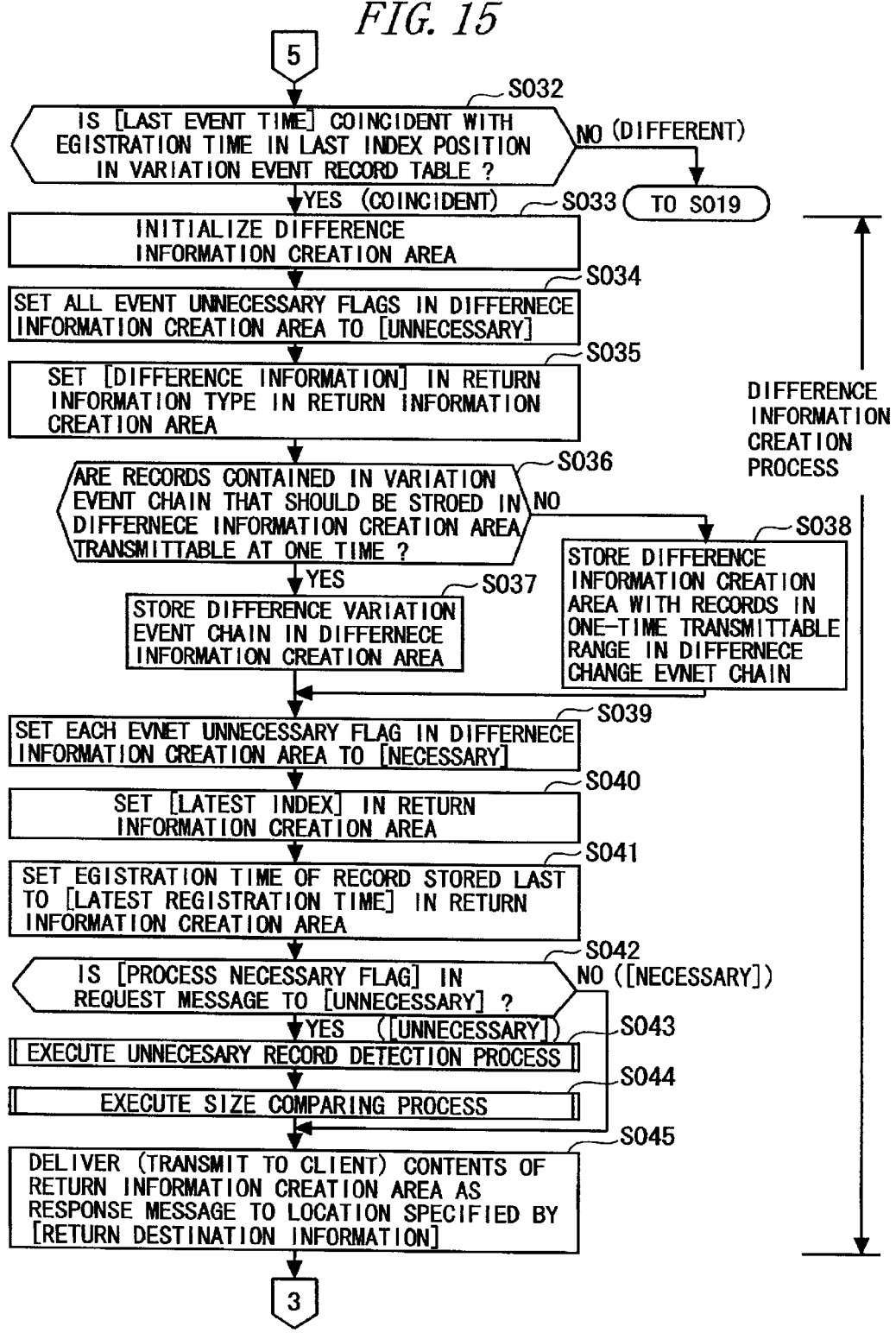
FIG. 15 is a flowchart showing the processes in the server.

By contrast, when the processing proceeds to S032 in FIG. 15, the management module 46 executes the difference information creation process. More specifically, in S032, the management module 46 detects a record corresponding to the [last index] in the request message from the variation event record table 47. Then, the management module 46 judges whether or not the [event registration time] in the detected record is coincident with the [last event time] in the request message.

In this case, if the [event registration time] is not coincident with the [last event time] (S032; N), the management module 46 judges that the index is invalid, and diverts the processing to S019 shown in FIG. 13, wherein the management module 46 executes the real information return preparation process described above. Whereas if the [event registration time] is coincident with the [last event time] (S032;

Y), the management module 46 judges that the index is valid, and advances the processing to S033.

When the processing proceeds to S033, the management module 46 executes the difference information creation process in S033~S046. Namely, the management module 46 initializes the difference information creation area 51 (see FIG. 9) (S033).

Next, the management module 46 sets the event unnecessary flag in the difference information creation area 51 to [unnecessary] (S034). Subsequently, the management module 46 sets the [difference information] as the [return information type] in the return information creation area 50 (S035).

Next, the management module 46 estimates a quantity of the records by an algorithm consisting of the following steps (conditions) (1)~(4), and thereby judges whether or not a data quantity of a single or a plurality of records that should be stored as the difference variation event chain among the plurality of records stored in the variation event record table 47, is transmittable by one signal transmitting process (S036).

In this case, the management module 46, when judging that it is transmittable at one time, all the variation event records forming the difference variation event chain are detected from the variation event record table 47. Then, the management module 46, with [last index +1] being set as an origin, stores the records that meet the conditions (1)~(4) in the sequence of the indexes in the difference information creation area 51 (S037: see FIG. 9) (the top record in the difference information creation area invariably becomes a record in a position of [last index +1] or in the "0" position). Thereafter, the processing proceeds to S039.

In S037, in order for the management module 46 to extract the difference variation event chain from the variation event record table 48, the variation event record table 48 has the ring buffer structure, and hence the difference variation event chain is specified as follows:

(1) A Case of Last Index<Latest Index

The variation event records corresponding to the indexes from "last event+1" up to the latest index, are set as the difference variation event chain.

(2) A case of N−1>Last Index>Latest Index

The variation event records corresponding to the indexes from "last event+1" up to "N−1" and from the index number "0" up to the latest index, are set as the difference variation event chain.

(3) A case of Last Index=N−1>Latest index

The variation event records corresponding to the indexes from the index number "0" up to the latest index, are set as the difference variation event chain.

(4) A case of Last Index=Latest Index

There is no difference variation event chain.

To describe the processing in greater details, the followings are executed.

(a) Calculation of Whole copy Record count N1 (when set transferable at one time)

A copy record count N1 is calculated from the last index and the latest index.

(b) Determination of Copy Record count N2

A minimum value (min) of the copy record count N1 and an upper limit No. (upper limit number) of the transferable record count is drawn out and set as a copy record count N2. An index position I2=[(last index+N2) modN] becomes the [latest index] of the client return information. An [event registration time] in the index position I2 in the variation event table becomes the [latest registration time] of the return information to the client.

(c) N2-pieces of records are copied in sequence (circularly) to the difference information creation area 51, wherein an index position obtained by [last index+1] modN serves as an origin.

In connection with this, the management module 46, when making a judgement of being impossible of transmitting at one time, detects, from the variation event record table 47, the variation event records within a one-time transmittable range among the plurality of variation event records forming the difference variation event chain, and stores those event records in the difference information creation area 51 (S038). Thereafter, the processing proceeds to S039.

In S039, the management module 46 sets to [unnecessary] the event unnecessary flag with respect to each variation event record stored in the difference information creation area 51. Subsequently, the management module 46 sets, as the [latest index] in the return information creation area 50, the index number allocated to the latest variation event record among the records stored in the difference information creation area 51 at the present (S040).

Next, the management module 46 sets, as the [latest registration time] in the return information creation area 50, the [event registration time] when the variation event record table 48 is stored with the variation event record stored last in the difference information creation area 51, i.e., the variation event record allocated with the index number set as the [latest index] in the return information creation area 50 (S041).

Subsequently, the management module 46 judges whether or not the process necessary flag (see FIG. 10) in the request message stored in the request receiving area 52 is set to [unnecessary] (S042). In this case, if the process necessary flag is set to [necessary], the processing proceeds to S045. If the process necessary flag is set to [unnecessary], the processing proceeds to S043.

In S043, the management module 46 executes an unnecessary record removing process. That is, the management module 46 refers to the variation event records forming the difference variation event chain (or a part of this event chain) stored in the difference information creation area 51 in the reverse sequence from the record stored last in the difference information creation area 51 towards the top record therein.

In this case, the management module 46, when detecting the variation event record containing the event type [delete], sets, to [unnecessary], the event unnecessary flag for the variation event record containing the same [object name] as that of the variation event record registered earlier in the variation event record table 48 than the detected variation event record. The management module 46, however, if there exists the variation event record containing the same [object name] and the same event type [add] as those of the variation event record registered earlier in the variation event record table 48 than the variation event record containing [delete], sets the event unnecessary flag for the variation event record containing the event type [delete] to [unnecessary].

Thereafter, the management module 46, when detecting the variation event record containing the event type [update], sets the event unnecessary flag to [unnecessary] with respect to the variation event records registered earlier than the detected variation event record and containing the same [object name] as that of the detected variation event record, of which the type is [update].

The followings are more specific steps in the processes described above.

<Work Area>

The following sub work areas are prepared as work areas.
WU: Sub work area (update)
WD: Sub work area (delete)
IDX: Loop counter The sub work areas WU, WD are dictionary areas for retaining the following records.

<Record Structure>

Object Name and Index in Difference Information Creation Area 51

Each of the sub work areas WU and WD retains the [object name] and the [index in difference information creation area 51].

<Steps>

(1) (Copy record count N2)-1((index of record stored last in difference information creation area 51)-1) is substituted into IDX.

(2) WU and WD (set in a record-unregistered state) are initialized.

(3) The following steps (3-1)~(3-4) are repeated during IDX≧0.

(3-1) A record in an IDX position is read out of the difference information creation area 51.

(3-2) A case where the object name is registered in WD.

(3-2-1) A record in the index position specified by IDX in the difference information creation area 51 is set as being "unnecessary".

(3-2-2) If the type is defined as [add], a record (of which the type is [delete]) in the index position specified by the [index in difference information creation area 51] of the record detected in the difference information creation area 51, is set as being "unnecessary".

(3-3) In a case where the [object name] in the record read out is not registered in WD, the processing diverts (to three steps) depending on the [type].

(3-3-1) If the [type] is [delete], and if the object name is not yet registered in WD, this object name is registered in WD.

(3-3-2) If the [type] is [update], and if the object name is not yet registered in WU, this object name is registered in WU. Whereas if the object name has already been registered in WU, the record in the index position specified by IDX is set as being "unnecessary".

(3-3-3) If the [type] is [add], nothing is done.

(3-4) IDX is decremented by 1.

(4) End

As a result, the number of the variation event records of which the event unnecessary flag is set to [necessary] comes to 2 at the maximum, and the unnecessary variation event record occurs in any one of the following patterns in the order of registration.

(1) Only [add];
(2) [Add]+[update] (only what has been done last); and
(3) Only [delete].

Thus, the unnecessary variation event record is detected, and hence the quantity of the data that should be transmitted to the client is reduced. upon an end of the unnecessary record removing process, the management module 46 advances the processing to S044.

In S044, the management module 46 executes a size comparing process. To be specific, the management module 46 judges whether or not a size of all the variation event records (which are simply termed [necessary records]) of which the event unnecessary flags are set to [necessary] in the unnecessary detection process, is larger than a size of all the records (which are referred to as [latest state table records]) stored in the latest state table 47.

At this time, if the size of the necessary records is larger than the size of the latest state table records, the processing proceeds to S019, wherein the above-mentioned real information return preparation process is carried out. Whereas if the size of the necessary records is equal to or smaller than the size of the latest state table records, the management module 46 stores the necessary records in the information field in the return information creation area 50 in the order of registration thereof. If no necessary record exists, however, the information ("nothing") indicating that the [difference information] does not exist is stored in the information field. Thereafter, the processing proceeds to S045.

In S045, the management module 46 delivers as a response message the contents stored in the return information creation area 50 to a location (that is an address of the client) specified by the [return destination information] in the request message. Namely, the communication control unit 23 shown in FIG. 2 delivers the response message via the communication line to a communication control unit 38 of the relevant client.

<<Processes in Each Client>>

Next, the processes in the clients 11~13 (i.e., the processes by the management module 55 of the object state requesting unit 54) will be explained. FIGS. 16~19 are flowcharts showing the processes in the client.

Figure 16:
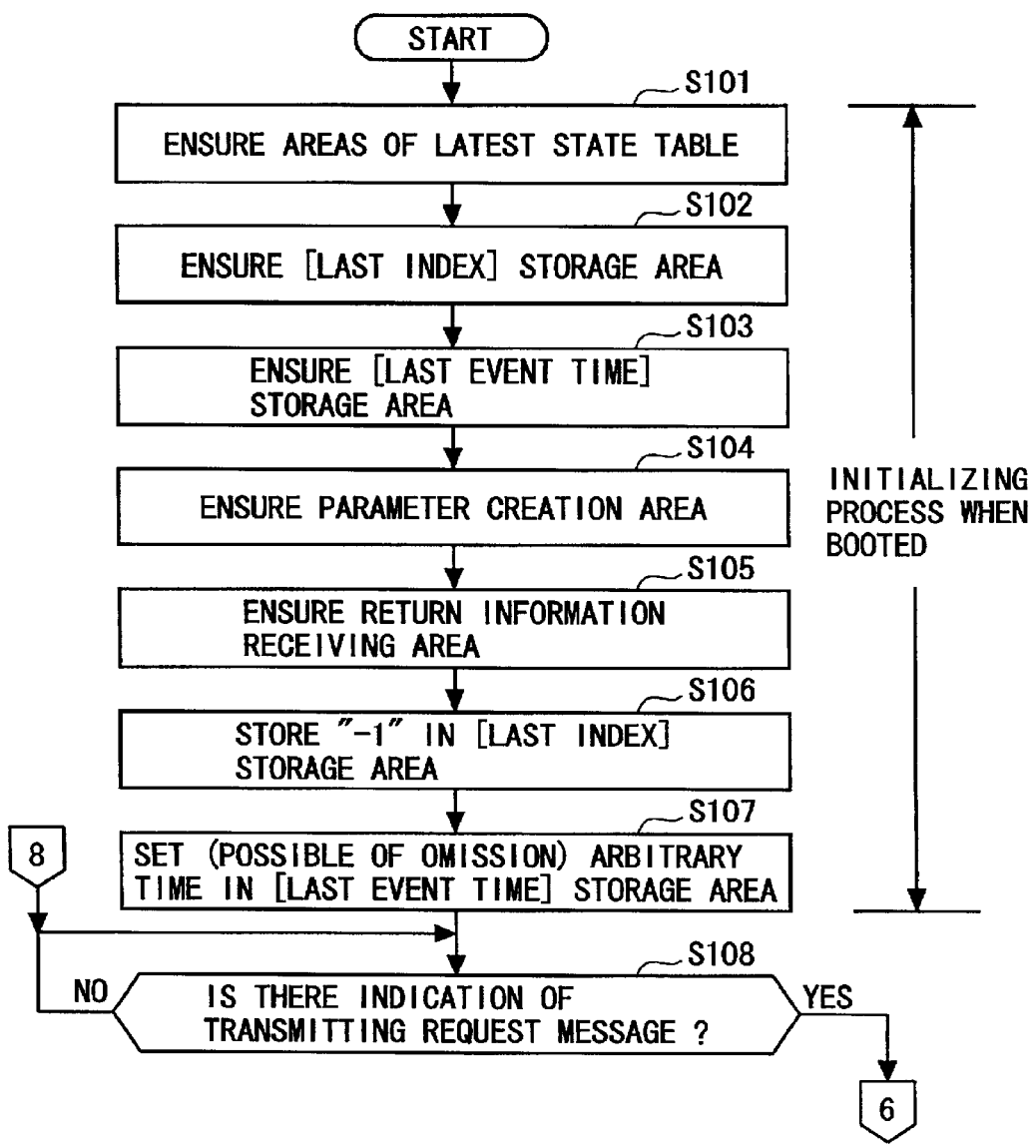
FIG. 16 is a flowchart showing processes in a client.

Referring to FIG. 16, the management module 55 starts processing upon switching ON an unillustrated power source of the client. In S101~S107, the management module 55 executes the initializing process when booted.

That is, the management module 55 ensures (creates), on the RAM 32, the areas of the latest state table 56, the [last index] storage area 57 and the [last event time] storage area 58 each having a sufficient size (S101, S102, S103).

Next, the management module 55 ensures (creates), on the RAM 32, the parameter creation area 59 and the return information receiving area 60 each having a sufficient size (S104, S105).

Next, the management module 55 stores the [last index] storage area 57 with "-1" indicating that the response message is not yet received from the server 10 (S106). Further, the management module 55 sets an arbitrary time in the [last event time] storage area 58 (S107). This step S107 may, however, be omitted.

Figure 17:
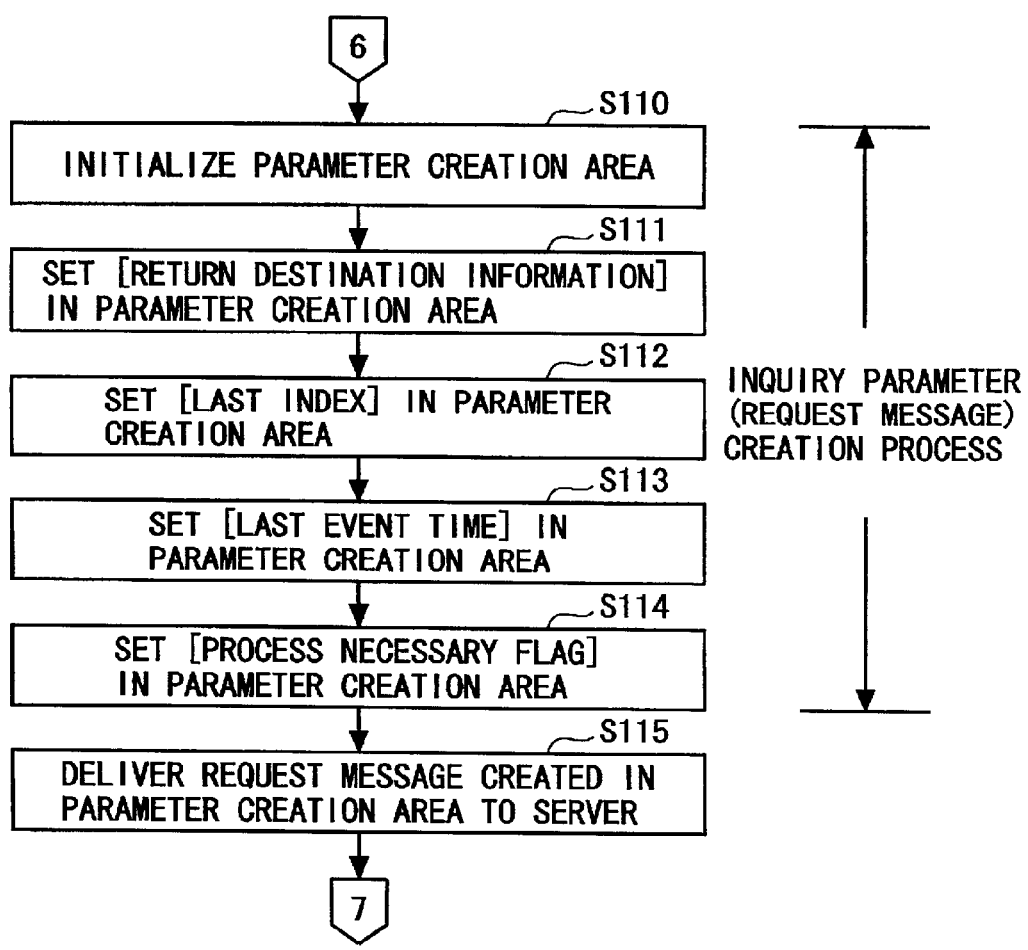
FIG. 17 is a flowchart showing the processes in the client.
Figure 18:
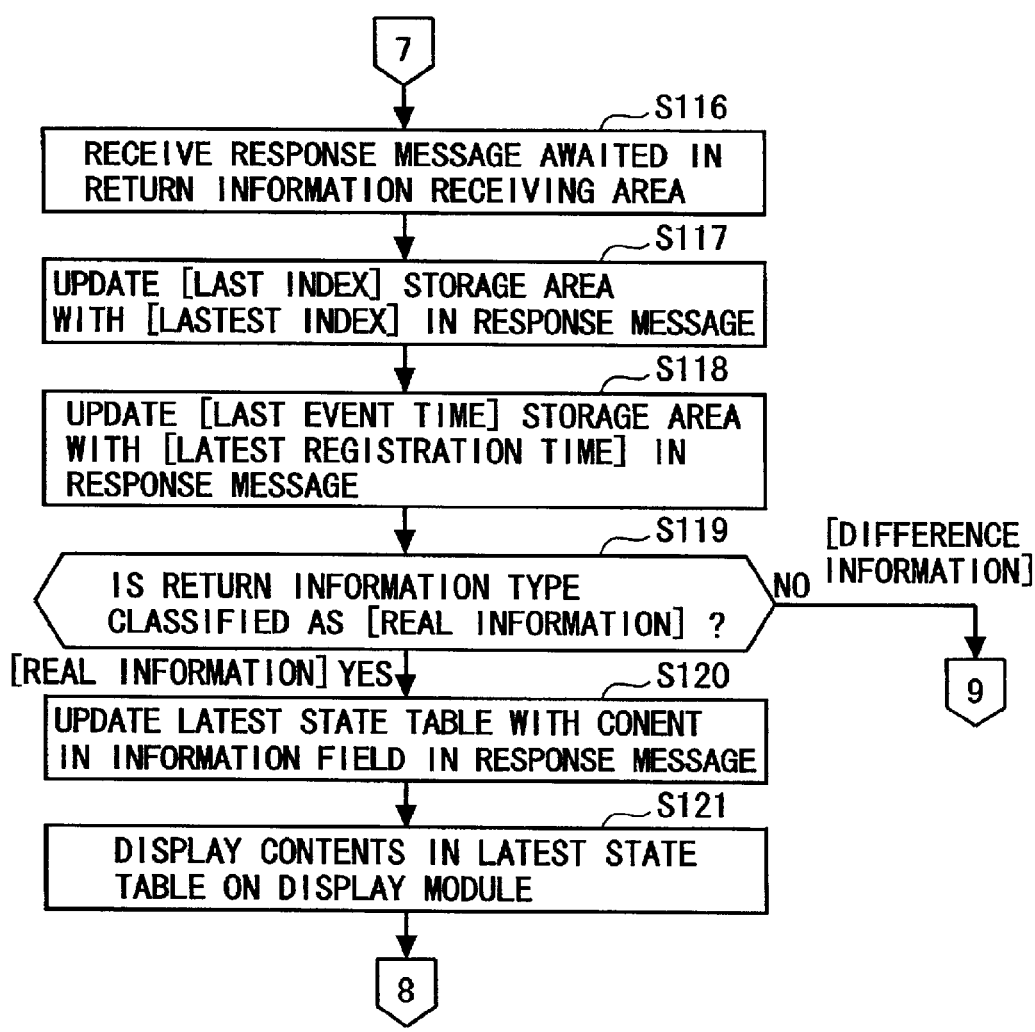
FIG. 18 is a flowchart showing the processes in the client.

In S108, the management module 55 waits an indication of delivering the inquiry message (request message) about the state information with respect to the server 10, and, when receiving the delivery indication, advances the processing to S110 shown in FIG. 17.

The operator of the client may input this delivery indication to the client by use of the KBD 42 and the mouse 43, or may be given automatically based on setting in the management module 55. Further, the delivery indication may also be periodically issued.

In S109, the management module 55 judges whether or not the response message is received from the server 10. When receiving the response message, the processing proceeds to S116 shown in FIG. 18. Whereas if not received, the processing loops back to S108.

When the processing proceeds to S110 shown in FIG. 17, the management module 55 executes an inquiry parameter (request message) creation process in S110~S114. That is, in S110, the management module 55 initializes the parameter creation area 59 (see FIG. 10).

In S111, the management module 55 stores a piece of information on a location (address) of the return information receiving area 60 in the [return destination information] in the parameter creation area 59.

In S112, the management module 55 sets (stores) a value (index number) in the [last index] storage area 57 in the [last index] in the parameter creation area 59.

In S113, the management module 55 sets the time retained in the [last event time] storage area 58 in the [last vent time] in the parameter creation area 59.

In S114, the management module 55 sets [necessary] or [unnecessary] in the process necessary flag in the parameter creation area 59 as the necessity for the processes of the state variations may arise.

In S115, the management module 55 transmits toward the server 10 the request message created in the parameter creation area 59 by the processes in S110~S114. To be specific, the communication control unit 38 shown in FIG. 3 delivers the request message via the communication line to the communication control unit 23 of the server 10.

Thereafter, the management module 55, awaiting the response message, stores this response message (see FIG. 8) from the server 10 in the return information receiving area 60 (S116).

In S117, the management module 55 overwrites the [latest index] contained in the response message to the [last index] storage area 57. The [last index] storage area 57 is thereby updated.

In S118, the management module 55 overwrites the [latest registration time] contained in the response message to the [last event time] storage area 58. The [last event time] storage area 58 is thereby updated.

In S119, the management module 55 judges whether or not the [return information type] contained in the response message is the [real information]. At this time, if the [return information type] is judged to be the [real information], the processing proceeds to S120. Whereas if not, the [return information type] may be conceived as the [difference information], the processing proceeds to S122 shown in FIG. 19.

When the processing proceeds to S120, the management module 55 updates the latest state table 56 with the content stored in the information field of the response message. With this updating, the latest state table 56 comes to a state where the latest state of each of the objects 1~3 is retained at the present.

Thereafter, in S121, the management module 55 displays the contents of the latest state table 56 on the display module 61. The latest state of each of the objects 1~3 is thereby displayed on the display device 41 (see FIG. 3) of the client. Thereafter, the processing returns to S108.

Figure 19:
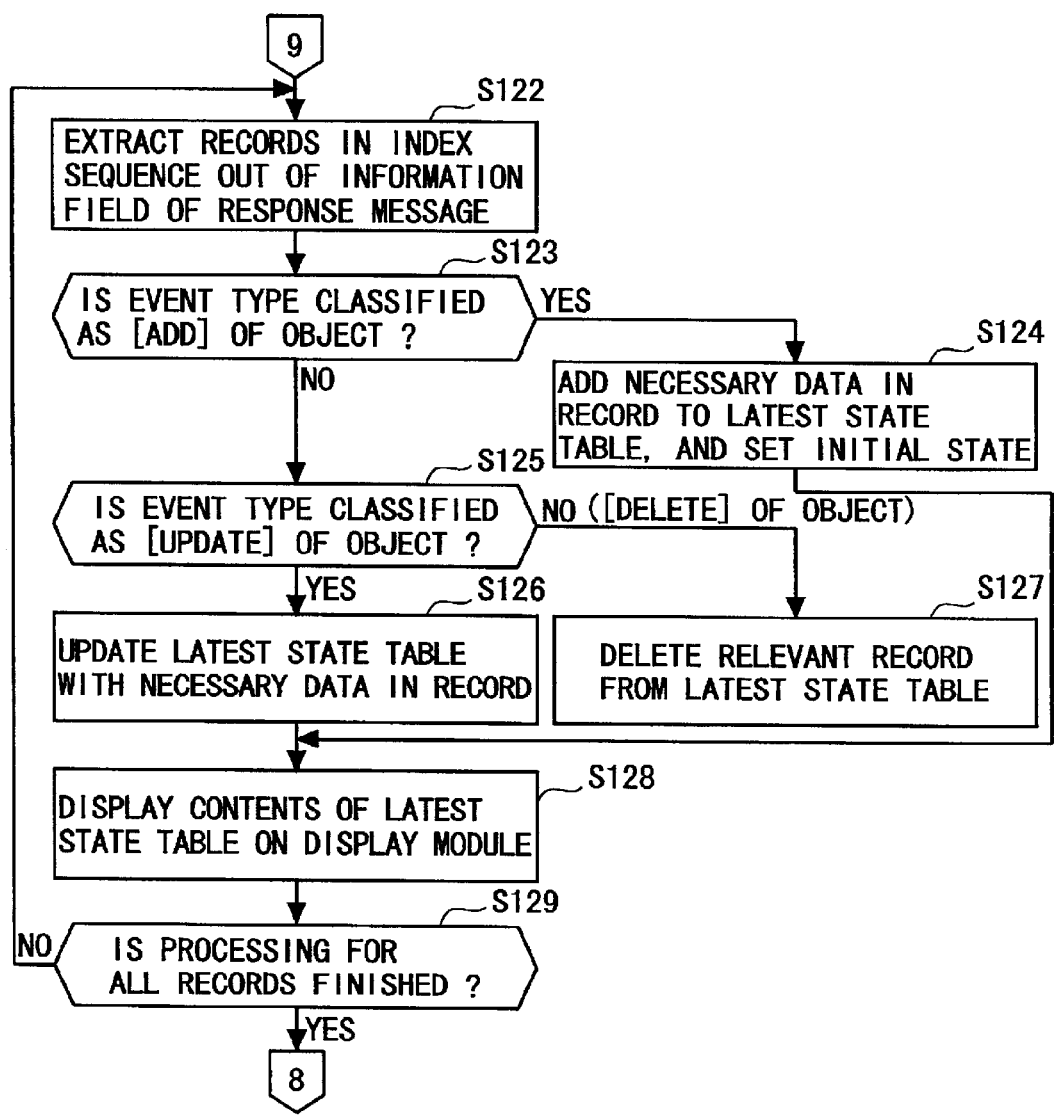
FIG. 19 is a flowchart showing the processes in the client.

While on the other hand, when the processing goes forward to S122 shown in FIG. 19, the management module 55 extracts one record related to the variation event in the index sequence, which is stored in the information field of the response message.

In S123, the management module 55 judges whether or not the event type of the record extracted in S122 is [add]. At this time if the vent type is [add], the processing proceeds to S124. Whereas if not, the processing moves to S125.

When the processing proceeds to S124, the management module 55 newly stores the latest state table 56 with necessary pieces of data (the [object name] and the [event occurred time]) in the record, and sets an initial state of this object as the [state]. Thereafter, the processing shifts to S128.

When the processing goes to S125, the management module 55 judges whether or not the event type in the record extracted in S122 is [update]. At this time, if the event type is categorized as the [update], the processing proceeds to S126. Whereas if not, the event type may be conceived as the [delete], and the processing goes forward to S127.

When the processing proceeds to S126, the management module 55 updates the latest state table 56 with necessary pieces of data (the [object name], the [state] and the [event occurred time]) in the record, and advances the processing to S128. The state of the object corresponding to the record concerned is thereby updated to the latest content.

When the processing shifts to S127, the management module 55 deletes the record corresponding to the record concerned out of the latest state table 56, and the processing proceeds to S128. The record of the object corresponding to the [delete] is thereby deleted from the latest state table 56.

When the processing proceeds to S128, the management module 55 makes the display mode 61 display the contents of the latest state table 56, and thereafter advances the processing to S129.

In S129, the management module 55 judges whether or not the processes in S122~S128 are executed with respect to all the records stored in the information field of the response message. At this time, if executed for all the records, the processing goes back to S108 shown in FIG. 16. Whereas if not executed for all the records, the processing loops back to S122, wherein the process in S123~S128 are executed with respect to a next record.

Note that a reply to one request from the client is given only once. Therefore, if the server 10 is incapable of transmitting the difference variation event chain to the client at one time (if all the records that should be transmitted to the client can not be transmitted), the client receiving the response message delivers afresh the request message to the server 10 by use of the [latest index] in the response message, thereby receiving the records after N2+1 in the variation event record table 48 which could not be received last time (those records corresponding to the remainder of the difference variation event chain).

Herein, there may be taken a mode of explicitly informing the client of whether or not all or necessary records in the difference variation event chain are received. In this case, a structure is that any one of the [difference information (continued)], the [difference information (not continued)] and the [real information] may be set as the return information type of the response message (see FIG. 10). If the server 10 is incapable of transmitting (transferring) the records that should be transmitted by one reply, a contrivance is that the response message containing the [difference information (continued)] is transmitted to the client. If thus contrived, a redelivery of the request message to the server 10 is triggered by the client's recognition of this return information type [difference information (continued)].

The followings are the processes of the clients 11~13 in the case of taking the above architecture. The server 10, if unable to transmit the records at one time, returns the response message containing the difference information (continued), and prompts the client to make a request again. Each of the clients 11~13, upon receiving the response message, makes the display module 61 display a purport (that all the records that should be received from the server 10 can not be received). Thereafter, the processing is returned to the initialization (S110) of the parameter creation area without going back to the confirmation of the request message (S108).

If the server 10 is capable of transmitting, to the client at one time, all the records that should be transmitted, the server 10 returns the response message containing the [difference information (not continued)] to the client, and notifies the client of a completion of the processing. The client, when receiving the response message, displays on the display module 61 a purport (that all the records that should be received are received from the server 10) (S121 or S129), and returns the processing to the confirmation of the request message (S108).

<Operational Examples>

Operational examples of the information management system described above will be explained.

A case where the object state management unit 45 of the server 10 manages the states of the objects 1~3, will be explained by way of an operation example.

Referring to FIG. 4, when the server 10 performs the communications with the host computer 15, the server 10 executes the application program retained on the HDD 19 etc, thereby booting an application A to control the objects 1~3 (see FIG. 4).

For example, the object 1, under the control of the application A, performs mainly line connections, communications and line disconnections between the application A (server 10) and the host computer 15.

Figure 20:
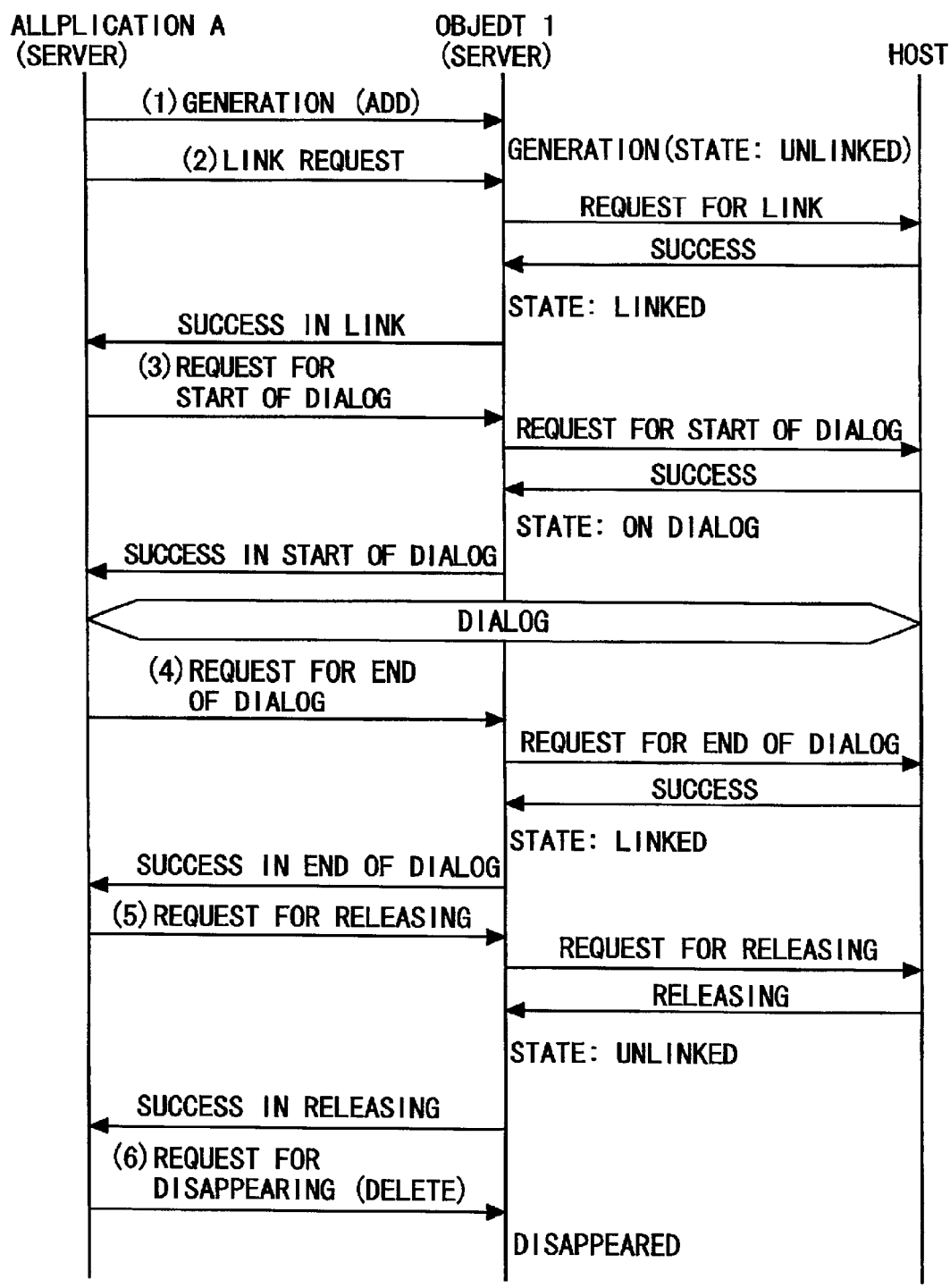
FIG. 20 is a sequence diagram showing communications between the server and a host computer.

FIG. 20 is a sequence diagram showing an example of the communications between the server 10 and the host computer 15. Referring to FIG. 20, the object 1 is invoked (created) and finishes (disappears) by the application A. The object 1 changes to any one of three states such as an [unconnected state], a [connected state] and a [dialog state] during action. Further, in the example shown in FIG. 20, the events related to the state variations of the object 1 are exemplified as follows:

(1) Add (Generation) of Object 1 AS Unconnected State (2) Update of Object 1 TO Connected State (3) Update of Object 1 TO Dialog State (4) Update of Object 1 TO Connected State (5) Update of Object 1 TO Unconnected State (6) Delete (Disappear) of Object 1

In the cases given above, the object state management unit 45 receives the messages of the variation events from the objects 1~3, thereby obtaining and managing the state information of the objects 1~3 and giving the response messages (state information) corresponding to the request messages from the clients 11~13.

In this operation example, the variation event record table 48 of the server 10 takes the ring buffer structure consisting of 10 pieces (N=10) of storage areas stored with the variation event record records. The areas of the variation event record table 48 are cyclically used, and hence a variation event occurred the i-th time (the variation event registered first time is set as the 0th event), is stored in an (imod10)th area (index position) from the top of the variation event record table 48.

Further, in the following discussion, for simplifying the explanation, it is assumed that the object state management unit 45 will have started up before each of the clients 11~13 starts up. Further, a time for registering a communication time and the variation event in the record table 48, an update time of the latest state table 47 and a response message creation time, are ignored. Moreover, a relation such as "difference information size <real information size" is always established.

On the other hand, each of the clients 11~13 sets "-1" in the [last index] of the request message (see FIG. 10) when making the first request (inquiry). When making a request from the second time onwards, the index and the time within the response message to the last request shall be specified as the [last index] and [last event time]. Further, it is assumed that each of the clients 11~13 sets the process necessary flag (see FIG. 10) to [unnecessary], and only the latest state information is requested.

By the way, it is presumed that fifteen variation events shown in FIG. 21 occur (each event occurred time thereof is omitted). As shown in FIG. 21, the variation event record table 48 consists of the ten storage areas stored with the variation event records, and therefore the 10th through 14th variation event records are stored in the areas given the index numbers "0"~"4".

By contrast, it is assumed that for instance, the client 11 delivers the following request message REQ 1-1 as a first request message.

(Request message REQ 1-1: first time) Oct.20, 1998 12:32:30.00

Responding to this request message REQ 1-1, in the server 10, the processes shown in FIGS. 11~15 are executed, and a response message RSP1-1 is created and delivered to the client 11. Contents of the response message RSP1-1 are as follows:

(Response message RSP1-1 )

(1) Return information type: Real information (2) Latest index: 2

(3) Latest index registration time: Oct. 20, 1998 12:32:00.00

(4) Information field: Object 1 Connected state Object 2 Unconnected state

Herein, the request message REQ1-1 is defined as the first request for the state information with respect to the server 10, the state information to be returned is the real information, and the variation event records registered first time through third time are stored in the information field.

Further, when the client 11 receives the response message RSP1-1, the display module 61 (display device 41) of the client 11 displays a display content VIEW1-1 which follows.

(VIEW1-1: Display content after receiving the response message RSP1)

| Objects | States |
| --- | --- |
| Object 1 | Connected state |
| Object 2 | Unconnected state |

It is assumed that the client 11 thereafter delivers a next request message REQ1-2 as the second request message.

(Request message REQ1-2: Second time) Oct. 20, 1998 12:35:30.00

In response to this request message REQ1-2, the server 10 transmits a next response message RSP1-2 to the client 11.

(Response message RSP1-2)

(1) Return information type: Difference information (2) Latest index: 5

(3) Latest index registration time: Oct. 20, 1998 12:35:00.00

(4) Information field: [Update] of Object 1 TO Dialog state [Update] of Object 2 TO Dialog state Herein, the request message REQ1-2 is the second request, and hence the state information to be returned may be conceived as the difference information. Further, both of the variation event records given the index numbers 4, 5 are related to [update] of the object 2, and therefore the older variation event record given the smaller index number 4 has been deleted.

Moreover, when the client 11 receives the response message RSP1-2, the display content on the display module 61 (display device 41) of the client 11 is changed into a display content VIEW1-2 which follows.

(VIEW1-2: Display content after receiving the response message RSP 2-1)

| Objects | States |
|---|---|
| Object 1 | Dialog state |
| Object 2 | Dialog state |

It is assumed that the client 11 thereafter delivers a next request message REQ1-3 as the third request message.
(Request message REQ1-3: Third time) Oct. 20, 1998 12:41:30.00

In response to this request message REQ1-3, the server 10 transmits a next response message RSP1-3 to the client 11.
(Response message RSP1-3)
(1) Return information type: Difference information
(2) Latest index: 1
(3) Latest index registration time: Oct. 20, 1998/10/20 12:41:00.00
(4) Information field: [Update] of Object 1 TO Unconnected state Herein, one cycle of the event records is made in the variation event record table 48. Further, the variation event record (the 10th record) containing [delete] of the object 3 is included in the difference variation event chain, and hence the variation event records (the 7th ~9th records) each containing [update] of the object 3 before the 10th variation event record, are deleted. Moreover, the 6th record is the record containing [add] of the object 3, and therefore the 10th record is likewise deleted.

Thereafter, when the client 11 receives the response message RSP1-3, the display content on the display module 61 (display device 41) of the client 11 is changed into a display content VIEW1-3 which follows.
(VIEW1-3: Display content after receiving the response message RSP1-3)

| Objects | States |
|---|---|
| Object C1 | Unconnected state |
| Object C2 | Dialog state |

It is assumed that the client 11 thereafter delivers a next request message REQ1-4 as the fourth request message.
(Request message REQ1-4: Fourth time) Oct. 20, 1998 12:47:30.00

In response to this request message REQ1-4, the server 10 transmits a next response message RSP1-4 to the client 11.
(Response message RSP1-4)
(1) Return information type: Difference information
(2) Latest index: 4
(3) Latest index registration time: Oct. 20, 1998 12:41:00.00
(4) Information field: Delete (disappear) of Object 1 Delete (disappear) of Object 2

Herein, the variation event chain includes the variation event records (the 13th and 14th records) containing [delete] of the objects 1 and 2, so that the variation event records containing [update] that exist anterior the 13th and 14th records, are deleted.

Thereafter, when the client 11 receives the response message RSP1-4, the display content on the display module 61 (display device 41) of the client 11 is changed into a display content VIEW1-4 which follows.

(VIEW1-4: Display content after receiving the response message RSP 4-1)

| Objects | States |
|---|---|
| (Nothing) | (Nothing) |

"(Nothing)" given above shows that nothing is displayed. Note that the same content as the display content VIEW1-4 is displayed on the display module 61 before delivering the request message REQ1-1.

It is assumed that the client 11 thereafter delivers a next request message REQ1-4 as the fifth request message.
(Request message REQ1-5: Fifth time) Oct. 20, 1998 12:52:30.00

In response to this request message REQ1-5, the server 10 transmits a next response message RSP1-5 to the client 11.
(Response message RSP1-5)
(1) Return information type: Difference information
(2) Latest index: 4
(3) Latest index registration time: Oct. 20, 1998 12:44:00.00
(4) Information field: (Nothing)

Herein, no variation event occurs posterior to the 15th variation event, and hence the variation event record table 48 is not updated. Therefore, the variation event record is not stored in the information field.

Accordingly, even when the client 11 receives the response message RSP1-5, the display content on the display module 61 remains to be VIEW 4-1 described above.

Further, it is assumed that the client 11 thereafter delivers a next request message REQ2-1 as the first request message to the server 10.
(Request message REQ2-1) Oct. 20, 1998 12:29:30.00

In response to this request message REQ2-1, the server 10 transmits a next response message RSP2-1 to the client 11.
(Response message RSP2-1)
(1) Return information type: Real information
(2) Latest index: −1
(3) Latest index registration time: 0000/--00/00 00:00:00.00
(4) Information field: (Nothing)

Herein, no variation event record is registered in the variation event record table 48 (blank) of the server 10, so that "−1" is stored as the latest index.

Thereafter, when the client 11 receives the response message RSP2-1, the display content on the display module 61 (display device 41) of the client 11 is changed into a display content VIEW2-1 which follows.
(VIEW2-1: Display content after receiving the response message RSP2-1)

| Objects | States |
|---|---|
| (Nothing) | (Nothing) |

The display content on the display module before delivering the request message REQ2-1 is the same as VIEW2-1.

It is assumed that the client 11 thereafter delivers a next request message REQ2-1 as the second request message to the server 10.
(Request message REQ2-2) Oct. 20, 1998 12:30:30.00

In response to this request message REQ2-2, the server 10 transmits a next response message RSP2-2 to the client 11.

(Response message RSP2-2)
(1) Return information type: Real information
(2) Latest index: 0
(3) Latest index registration time: Oct 20, 1998 12:30:00.00
(4) Information field: Object 1 Unconnected state Herein, "−1" is set in the last index, and hence the variation event record registered first is stored in the real information.

Thereafter, when the client 12 receives the response message RSP2-2, the display content on the display module 61 (display device 41) of the client 11 is changed into a display content VIEW2-2 which follows.
(VIEW2-2: Display content after receiving the response message RSP2-2)

| Objects | States |
|---|---|
| Object 1 | Unconnected state |

It is assumed that the client 12 thereafter delivers a next request message REQ2-3 as the third request message.
(Request message REQ2-3) Oct. 20, 1998 12:40:30.00

In response to this request message REQ2-3, the server 10 transmits a next response message RSP2-3 to the client 12.
(Response message RSP2-3)
(1) Return information type: Real information
(2) Latest index: 0
(3) Latest index registration time: Oct. 20, 1998 12:40:00.00
(4) Information field: Object 1: Dialog state Object 1: Dialog state Herein, the area given the index number "0" is updated, so that the event registration time stored in the position (the rear with the index number 0) corresponding to the [last index] contained in the request message REQ2-3, is different from the [last event time] contained in the request message REQ2-3. Hence, the real information is stored in the information field. Namely, the information field is stored with the real information in which the variation event records registered first time through tenth time are reflected.

Thereafter, when the client 12 receives the response message RSP2-3, the display module 61 of the client 12 displays a next VIEW2-3.
(VIEW2-3: Display content after receiving the response message RSP2-3)

| Objects | States |
|---|---|
| Object 1 | Dialog state |
| Object 2 | Dialog state |

<Operation of Embodiment>

In accordance with this embodiment, the variation event record table 48 is stored with the hysteresis of the variation event that triggers the change of the state information in the server 10. Then, when receiving the request message for making the request for providing the state information of the object from each of the clients 11~13, among the plurality of variation event records registered in the variation event record table 48, the variation event records ranging from the record next to the variation event record obtained last by the client having delivered the request message up to the latest variation event record, are provided as the difference information to the client concerned.

Accordingly, if the server 10 provides the difference information given the priority over the real information in response to the request of the second time onwards from each of the clients 11~13, the data traffic between the client and the server can be restrained, thereby relieving the load on the network 14. Further, each of the clients 11~13 is capable of receiving the response message earlier than in the case of receiving the real information. Moreover, the difference information is created by use of the hysteresis of the variation events, thereby facilitating the creation of the difference information.

Further, the hysteresis of the variation events is recorded in the variation event record table 48, and the clients 11~13 are provided with all the variation event records that are not yet provided to the clients 11~13. Therefore, the clients 11~13 may not need to request the server 10 frequently to provide the state information. The load on the network 14 is thereby relieved.

Moreover, the difference information that should be provided to the clients 11~13 can be created by use of the variation event records stored in the variation event record table 48 in the server 10. Hence, there is no necessity of retaining the data for creating the difference information per client. Accordingly, a capacity of the memory resource of the server 10 can be restrained.

Moreover, the variation event record table 48 takes the ring buffer structure, so that the capacity of the memory resource of the server 10 can be restrained. Then, it is judged whether or not the difference information is created by use of the [last index] and the [last event time] contained in the request message. It is therefore possible to prevent incorrect difference information from being created because of the variation event record table 48 having the ring buffer structure.

Further, if the server 10 is unable to create the difference information, the each of the clients 11~13 is provided with the real information. Therefore, even if the server 10 can not create the difference information, each of the clients 11~13 is capable of obtaining the latest state.

Moreover, when each of the clients 11~13 requests only the latest states of the objects 1~3, the unnecessary record removing process (S043: see FIG. 15) is executed, whereby each of the clients 11~13 is provided with the subset of information obtained by removing the unnecessary records from the difference variation event chain. The quantity of the data to be transmitted can be thus restrained. Further, the size comparing process (S044: see FIG. 15) is executed, and the any one set of the difference information and the real information, which has the smaller quantity of data, is transmitted to the client. The quantity of the data to be transmitted can be thereby restrained.

Moreover, the display module 61 (display device 41) of each of the clients 11~13 displays the latest state of each of the objects 1~3 each time the response message is received. Therefore, the user (operator) of each of the clients 11~13 is able to know the states of the objects 1~3 in the server 10.

Note that when each of the clients 11~13 receives the difference information, the plurality of variation event records contained in the real information and the difference information received, may be displayed on the display module 61, and the hysteresis of the state variations of the objects 1~3 may also be displayed thereon. In this case, the hysteresis of the state variations may be displayed switched on the screen of the display module 61 by a manipulation of the KBD 42 and the mouse 43 or by auto screen switching.

Further, even if a trouble occurs in the communications between the server and the client, and, after trouble shooting, if capable of knowing the index when making the inquiry of the last time and the present index, the variation event during this period is received as the difference information, and this item of difference information is applied to the latest state table 56 held by the client. The client side is thereby able to recognize the latest state and the process leading to this state. Accordingly, if the trouble occurs in the communications, the client may not receive the real information from the server, and therefore the quantity of the data transmitted to the network can be restrained.

What has been discussed so far does not depend on the communication protocols, and can be therefore easily applied to the process-to-process communications by specifying the information within the same machine in the return destination information transferred to the server-sided program when making the request.

What is claimed is:

1. An information management apparatus for providing information under management in response to a request, comprising:

an acquisition module acquiring, each time a state of an object variable in plural types of states varies, state information on these state variations;

a storage module storing each piece of state information acquired by said acquisition module; and a providing module detecting, when receiving a request for providing the state information from a requester, the state information ranging from a piece of state information indicating that the state varies next to the state information provided last to the requester before receiving the providing request up to a latest piece of state information among pieces of state information stored in said storage module, and providing the requester with the detected state information as difference information.

2. An information management apparatus according to claim 1, wherein said storage module stores the state information in the acquiring sequence thereof, and said providing module provides the requester with the state information as the difference information ranging from the state information stored next to the state information provided last to the requester up to the latest state information.

3. An information management apparatus according to claim 1, wherein said providing module, when providing the state information to the requester, provides the requester with specifying information for specifying the latest state information stored in said storage module at that point of time, then detects, when receiving a providing request containing this piece of specifying information from the requester, state information ranging from a piece of state information indicating that the state varies next to the state information specified by the specifying information up to a latest piece of state information, as the state information provided last to the requester, among the pieces of state information stored in said storage module, and provides the requester with the detected state information as the difference information.

4. An information management apparatus according to claim 3, wherein said providing module, if unable to specify the state information that should be specified by the specifying information among the pieces of state information stored in said storage module, provides the requester with the latest state information stored in said storage module as a substitute for the difference information.

5. An information management apparatus according to claim 3, wherein said acquisition module acquires pieces of state information on a plurality of objects, said storage module stores each piece of state information acquired by said acquisition module, and said providing module, if unable to specify the state information that should be specified by the specifying information among the pieces of state information stored in said storage module, provides the requester with a latest piece of state information on each object as a substitute for the difference information.

6. An information management apparatus according to claim 3, further comprising a latest index retaining module for retaining, with pieces of index information being allocated to the state information stored in said storage module, a latest piece of index information as the index information allocated to the latest state information stored in said storage module, wherein the latest index information retained by said latest index retaining module is updated each time the state information is newly stored in said storage module, and said providing module, when providing the state information to the requester, provides the requester with the specifying information containing the latest index information retained by said latest index retaining module at that point of time, and, when receiving the providing request containing the specifying information from the requester, if the latest index information contained in the specifying information of this providing request is not coincident with the latest index information retained by said latest index retaining module, provides the difference information to the requester.

7. An information management apparatus according to claim 6, wherein said storage module includes a plurality of areas for storing the pieces of state information, and is further stored with registration time information on a time when each said areas is stored with the state information, said plurality of areas contain a top area and a bottom area, the pieces of state information are stored said areas in sequence from the top area, and, if a certain piece of state information is stored in said bottom area, the state information that should be stored next to said bottom area is stored in said top area, and said providing module, when providing the state information to the requester, provides the requester with the specifying information further containing a latest piece of registration time information as the registration time information corresponding to the latest state information stored in said storage module at that point of time, detects, when receiving the providing request containing the specifying information from the requester, from said storage module the registration time information corresponding to the state information allocated with the latest index information contained on the specifying information of that providing request, and, if the registration time information detected is coincident with the latest registration time information contained in the specifying information of that providing request, provides the difference information to the requester.

8. An information management apparatus according to claim 7, wherein said providing module, if the registration time information detected is not coincident with the latest registration time information contained in the providing request, provides the requester with the latest state information stored in said storage module.

9. An information management apparatus according to claim 7, wherein said acquisition module acquires the respective pieces of state information on the plurality of objects, said storage module is stored with these pieces of state information acquired by said acquisition module, and said providing module, if the registration time information detected is not coincident with the latest registration time information contained in the providing request, provides the requester with the latest state information of each object that is stored in said storage module.

10. An information management apparatus according to claim 1, wherein said providing module, if the requester makes the request for providing only the latest state information, extracts, as extraction information, the state information defined as the latest state information among the pieces of state information that should be provided as the difference information, and provides this piece of extraction information to the requester.

11. An information management apparatus according to claim 10, further comprising a latest state retaining module for retaining the latest state information stored in said storage module, wherein said providing module, if a data quantity of the extraction information is larger than a data quantity of the latest state information retained by said latest state retaining module, provides the requester with the latest state information retained in said latest state retaining module as a substitute for the extraction information.

12. An information management apparatus according to claim 10, wherein said acquisition module acquires the respective pieces of state information on the plurality of objects, said storage module is stored with these pieces of state information acquired by said acquisition module, said information management apparatus further comprising a latest state retaining module for retaining latest state information on each object that is stored in said storage module, and said providing module, if a data quantity of the extraction information is larger than a data quantity of the latest state information retained by said latest state retaining module, provides the requester with the latest state information of each object which is retained in said latest state retaining module as a substitute for the extraction information.

13. An information management system comprising:

an information management apparatus; and an information request apparatus, said information management apparatus including:

an acquisition module acquiring, each time a state of an object variable in plural types of states varies, state information on these state variations;

a storage module storing each piece of state information acquired by said acquisition module; and a providing module providing, when receiving a request for providing the state information from said information request apparatus, said information request apparatus with the state information ranging from a piece of state information indicating that the state varies next to the state information provided last to said information request apparatus before receiving the providing request up to a latest piece of state information among pieces of state information stored in said storage module.

14. An information management system according to claim 13, wherein said storage module stores the state information in the acquiring sequence thereof, and said providing module provides said information request apparatus with the state information as the difference information ranging from the state information stored next to the state information provided last to the said information request apparatus up to the latest state information.

15. An information management system according to claim 13, wherein said information request apparatus, when the state information is provided from said information management apparatus, notifies an information request apparatus user of a piece of information about the state information.

16. An information management system according to claim 15, wherein said information request apparatus, when plural pieces of state information are provided from said information management apparatus, notifies the information request apparatus user of a piece of information about the state information defined as a latest piece of state information among the plural pieces of state information provided.

17. An information management system according to claim 15, wherein said information request apparatus, when the plural pieces of state information are provided from said information management apparatus, notifies the information request apparatus user of a piece of information about each piece of state information.

18. An information providing method in an information management apparatus for providing information under management in response to a request, comprising:

acquiring, each time a state of an object variable in plural types of states varies, state information on these state variations;

storing each piece of state information acquired; and detecting, when receiving a request for providing the state information from a requester, the state information ranging from a piece of state information indicating that the state varies next to the state information provided last to the requester before receiving the providing request up to a latest piece of state information among pieces of state information stored in said storage module, and providing the requester with the detected state information as difference information.

19. An information providing method according to claim 18, further comprising storing the state information in the acquiring sequence thereof, and providing the requester with the state information as the difference information ranging from the state information stored next to the state information provided last to the requester up to the latest state information.

20. An information providing method according to claim 18, further comprising:

providing, when providing the state information to the requester, the requester with specifying information for specifying the latest state information stored in said storage module at that point of time, then detecting, when receiving a providing request containing this piece of specifying information from the requester, state information ranging from a piece of state information indicating that the state varies next to the state information specified by the specifying information up to a latest piece of state information, as the state information provided last to the requester, among the pieces of state information stored in said storage module, and providing the requester with the detected state information as the difference information.

21. An information providing method according to claim 20, further comprising providing, if unable to specify the state information that should be specified by the specifying information among the pieces of state information stored in said storage module, the requester with the latest state information stored in said storage module as a substitute for the difference information.

22. An information providing method according to claim 20, further comprising:
   acquiring pieces of state information on a plurality of objects,
      storing respective pieces of state information on the plurality of objects, and
      providing, if unable to specify the state information that should be specified by the specifying information among the pieces of state information stored in said storage module, the requester with a latest piece of state information on each object as a substitute for the difference information.

23. An information providing method according to claim 20, further comprising:
   allocating pieces of index information to the state information stored in said storage module;
   retaining, in said storage module, a latest piece of index information as the index information allocated to the latest state information stored in said storage module;
   updating the latest index information retained in said storage module each time the state information is newly stored in said storage module; and
   providing, when providing the state information to the requester, the requester with the specifying information containing the latest index information retained in said storage module at that point of time, and, when receiving the providing request containing the specifying information from the requester, if the latest index information contained in the specifying information of this providing request is not coincident with the latest index information retained in said storage module, providing the difference information to the requester.

24. An information providing method according to claim 23, further comprising:
   structuring said storage module so as to include a plurality of areas, containing a top area and a bottom area, for storing the pieces of state information;
   storing said storage module with registration time information on a time when each said areas is stored with the state information;
   storing the state information in said areas in sequence from said top area;
   storing in said top area, if a certain piece of state information is stored in said bottom area, the state information that should be stored next to said bottom area;
   providing, when providing the state information to the requester, the requester with the specifying information further containing a latest piece of registration time information as the registration time information corresponding to the latest state information stored in said storage module at that point of time; and
   detecting, when receiving the providing request containing the specifying information from the requester, from said storage module the registration time information corresponding to the state information allocated with the latest index information contained on the specifying information of that providing request, and, if the registration time information detected is coincident with the latest registration time information contained in the specifying information of that providing request, providing the difference information to the requester.

25. An information providing method according to claim 24, further comprising providing, if the registration time information detected from said storage module is not coincident with the latest registration time information contained in the providing request, the requester with the latest state information stored in said storage module.

26. An information providing method according to claim 24, further comprising:
   acquiring the respective pieces of state information on the plurality of objects;
   storing these pieces of state information on the plurality of objects; and
   providing, if the registration time information detected from said storage module is not coincident with the latest registration time information contained in the providing request, the requester with the latest state information of each object that is stored in said storage module.

27. An information providing method according to claim 18, further comprising:
   extracting, if the requester makes the request for providing only the latest state information, as extraction information, the state information defined as the latest state information among the pieces of state information that should be provided as the difference information, and providing this piece of extraction information to the requester.

28. An information providing method according to claim 27, further comprising providing, if a data quantity of the extraction information is larger than a data quantity of the latest state information stored in said storage module, the requester with the latest state information as a substitute for the extraction information.

29. An information providing method according to claim 27, further comprising:
   acquiring the respective pieces of state information on the plurality of objects;
   storing these pieces of acquired state information in said storage module; and
   providing, if a data quantity of the extraction information is larger than a data quantity of the latest state information stored in said storage module, the requester with the latest state information of each object which is stored in said storage module as a substitute for the extraction information.

30. A computer readable recording medium recorded with a program used for a computer to execute an information providing method in an information management apparatus for providing information under management in response to a request, said program comprising:
   a process of acquiring, each time a state of an object variable in plural types of states varies, state information on these state variations;
   a process of storing each piece of state information acquired; and
   a process of detecting, when receiving a request for providing the state information from a requester, the state information ranging from a piece of state information indicating that the state varies next to the state information provided last to the requester before receiving the providing request up to a latest piece of state information among pieces of state information stored in said storage module, and providing the requester with the detected state information as difference information.

31. A recording medium recorded with a program according to claim 30, further comprising a process of storing the state information in the acquiring sequence thereof, and a process of providing the requester with the state information as the difference information ranging from the state information stored next to the state information provided last to the requester up to the latest state information.

* * * * *

UNITED STATES PATENT AND TRADEMARK OFFICE
CERTIFICATE OF CORRECTION

PATENT NO. : 6,839,723 B2
DATED : January 4, 2005
INVENTOR(S) : Yuichiro Sugimoto et al.

It is certified that error appears in the above-identified patent and that said Letters Patent is hereby corrected as shown below:

Title page,
Item [75], Inventors, change "Akira Hayakawa, kohoku-gun" to -- Akira Hayakawa, Kohoku-gun --

Column 27,
Line 24, change "a" to -- the --

Column 30,
Line 31, change "a" to -- the --

Column 32,
Line 56, change "a" to -- the --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,839,723 B2
DATED : January 4, 2005
INVENTOR(S) : Yuichiro Sugimoto et al.

It is certified that error appears in the above-identified patent and that said Letters Patent is hereby corrected as shown below:

<u>Title page,</u>
Item [56], References Cited, FOREIGN PATENT DOCUMENTS,
change "JP      0818729 A2           1/1998" to
       -- EP    0818729 A2           1/1998 --.

Signed and Sealed this

Twenty-second Day of November, 2005

JON W. DUDAS
*Director of the United States Patent and Trademark Office*